(12) United States Patent
Csoban

(10) Patent No.: US 10,161,479 B2
(45) Date of Patent: Dec. 25, 2018

(54) DRIVE MECHANISM

(71) Applicant: Atakomb Kft., Budapest (HU)

(72) Inventor: Attila Csoban, Budapest (HU)

(73) Assignee: Atakomb Kft., Budapest (HU)

( * ) Notice: Subject to any disclaimer, the term of this patent is extended or adjusted under 35 U.S.C. 154(b) by 0 days.

(21) Appl. No.: 15/536,542

(22) PCT Filed: Dec. 16, 2015

(86) PCT No.: PCT/HU2015/000079
§ 371 (c)(1),
(2) Date: Jun. 15, 2017

(87) PCT Pub. No.: WO2016/097775
PCT Pub. Date: Jun. 23, 2016

(65) Prior Publication Data
US 2017/0335924 A1 Nov. 23, 2017

(30) Foreign Application Priority Data

Dec. 16, 2014 (HU) ..................................... 1400594

(51) Int. Cl.
*F16H 23/00* (2006.01)
*F16H 1/32* (2006.01)
*F16H 21/14* (2006.01)

(52) U.S. Cl.
CPC ............... *F16H 1/32* (2013.01); *F16H 21/14* (2013.01); *F16H 2001/323* (2013.01)

(58) Field of Classification Search
CPC ........ F16H 1/28; F16H 1/32; F16H 2001/321; F16H 2001/323; F16H 2001/324;
(Continued)

(56) References Cited

U.S. PATENT DOCUMENTS

| 4,674,361 A | 6/1987 | Parsons |
| 4,958,531 A | 9/1990 | Parsons |

FOREIGN PATENT DOCUMENTS

| CN | 201221591 | 4/2009 |
| CN | 201293074 | 8/2009 |

(Continued)

OTHER PUBLICATIONS

European Patent Office, International Search Report (Form PCT/ISA/210 and 220, 8 pgs.) and Written Opinion of the international Searching Authority (10 pgs.) dated Oct. 18, 2016.

*Primary Examiner* — Jeffrey A Shapiro
(74) *Attorney, Agent, or Firm* — Wood Herron & Evans LLP

(57) ABSTRACT

The invention is drive mechanism for transmitting rotating motion, comprising a drive mechanism housing (15) and a first shaft (10) rotatably connected to the drive mechanism housing (15), an eccentric shaft section (14, 18) being parallel with the first shaft (10) and being offset with respect to first shaft (10) by an eccentricity parameter value, a wobbling disc (25, 27) being rotatably connected to the eccentric shaft section (14, 18), and a wobbling gear-wheel (24, 26) connected by means of a fixed or a releasable connection to the wobbling disc (25, 27) and having an axis parallel with the first shaft (10). The drive mechanism according to invention further comprises a transmitting gear-wheel (22) having an axis of rotation arranged parallel with the axis of the wobbling gear-wheel (24, 26) at a distance therefrom determined by the eccentricity parameter value, being connected to the drive mechanism housing (15) as being rotatable around its axis of rotation, having a first toothing (28) with a teeth number different from the teeth number of the wobbling gear-wheel (24, 26), and connected to the wobbling gear-wheel (24, 26) with its first toothing (28), and a guiding connection establishing, upon motion of (Continued)

the first shaft (10), wobbling motion of the wobbling disc (25, 27) together with the connection between the wobbling gear-wheel (24, 26) and the transmitting gear-wheel (22), and having an axis being offset with respect to the axis of the eccentric shaft section (14, 18).

19 Claims, 22 Drawing Sheets

(58) Field of Classification Search
CPC ......... F16H 2001/325; F16H 2001/326; F16H 2001/327
USPC ................................................ 475/162–163
See application file for complete search history.

(56) References Cited

FOREIGN PATENT DOCUMENTS

| | | |
|---|---|---|
| DE | 19601103 | 7/1996 |
| EP | 2597333 | 5/2013 |
| GB | 1453135 | 10/1976 |
| JP | 2013221570 | 10/2013 |
| WO | 2011072601 | 6/2011 |

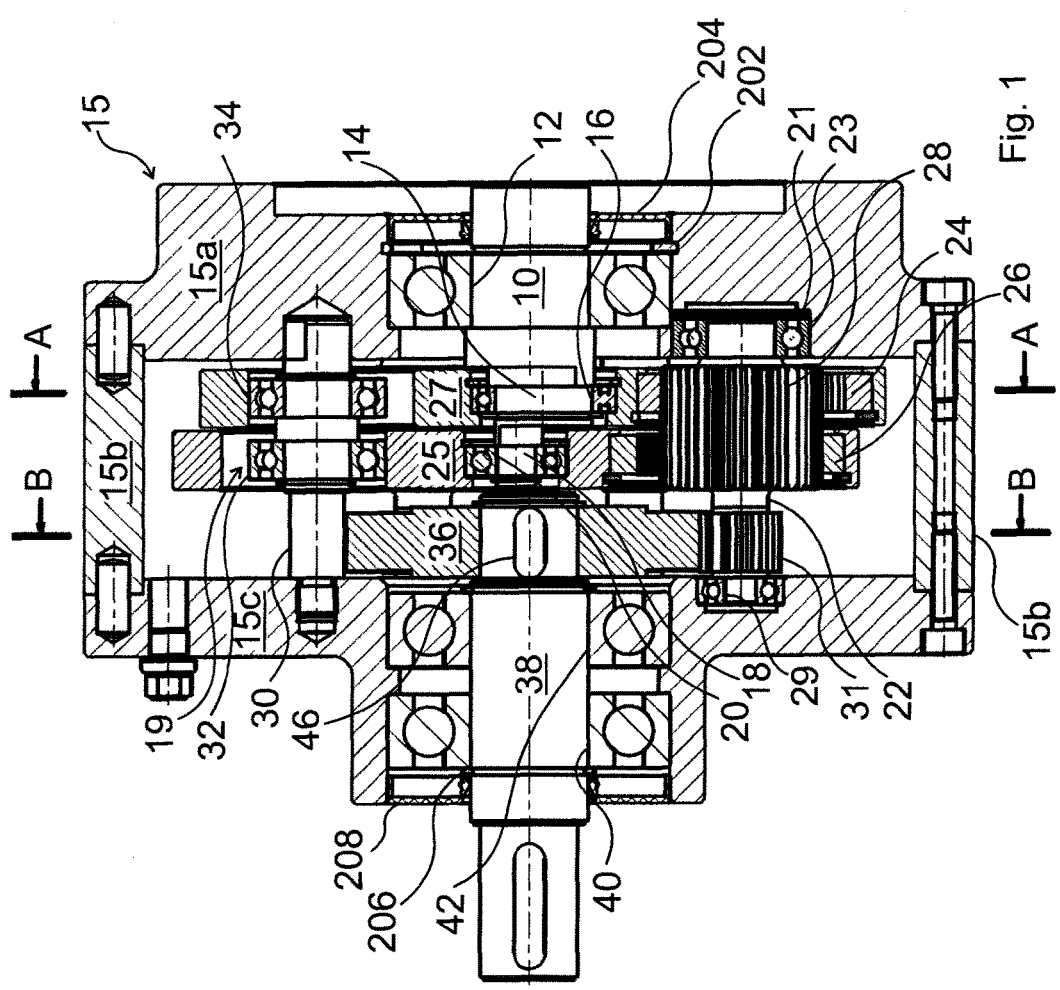

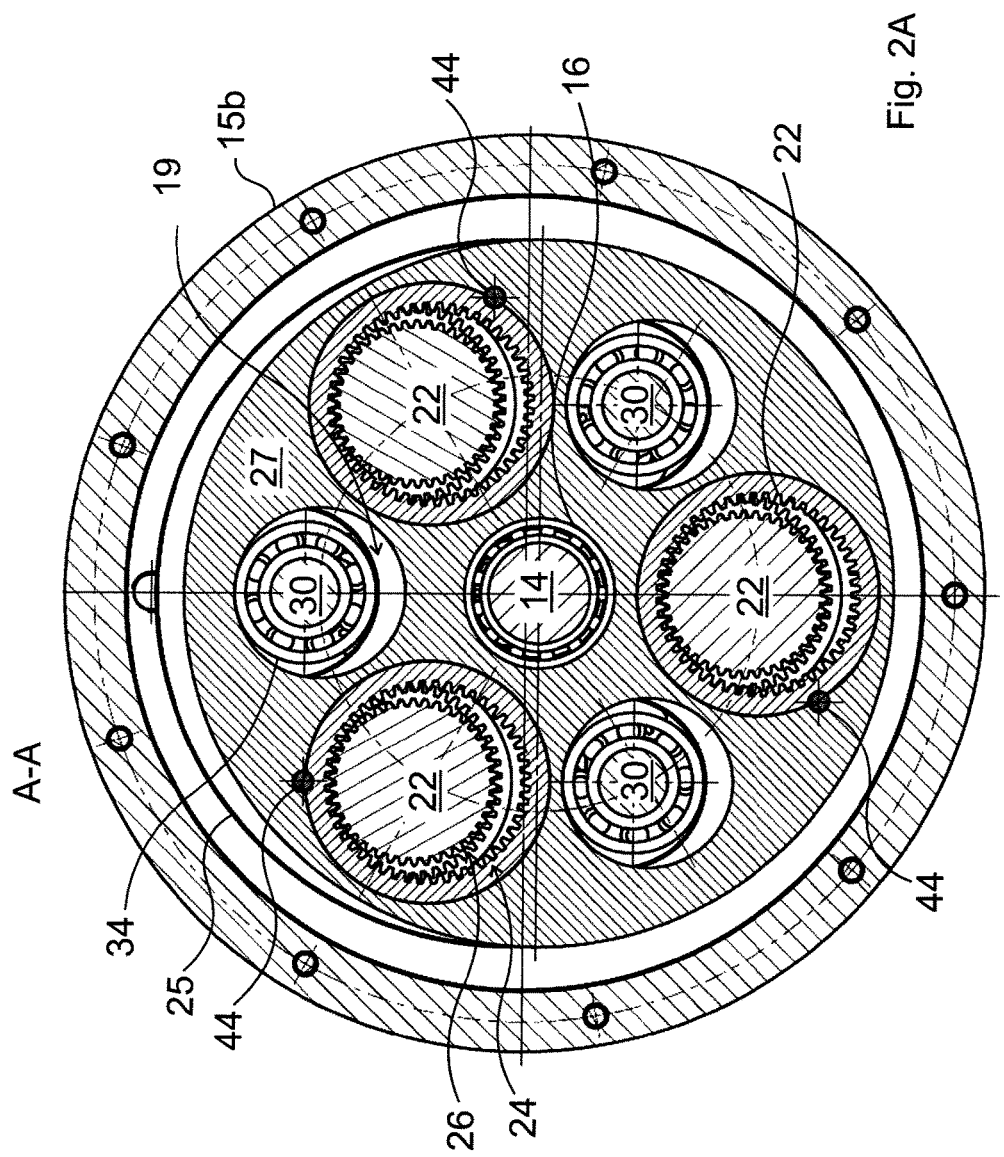

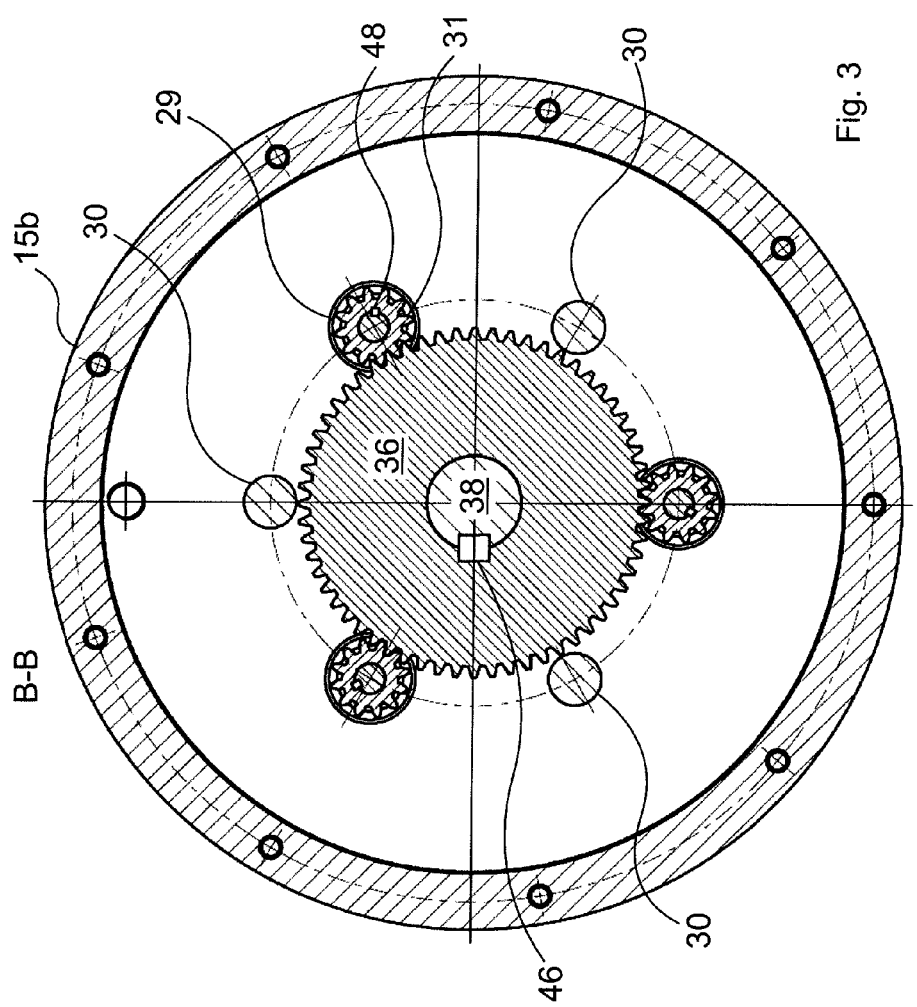

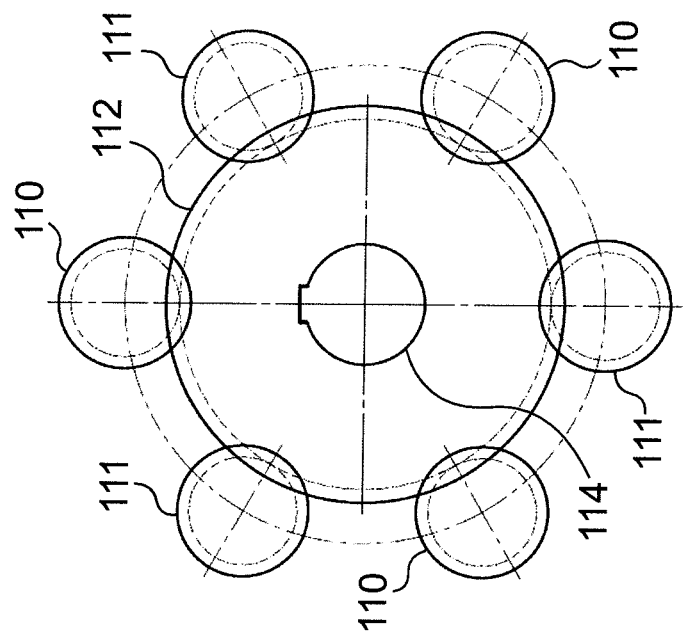
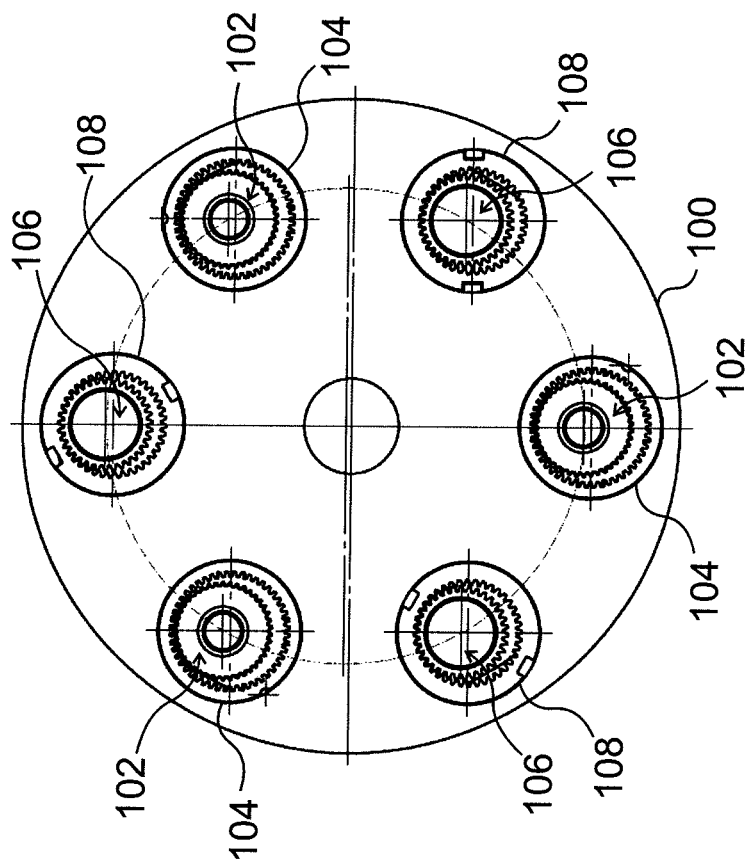

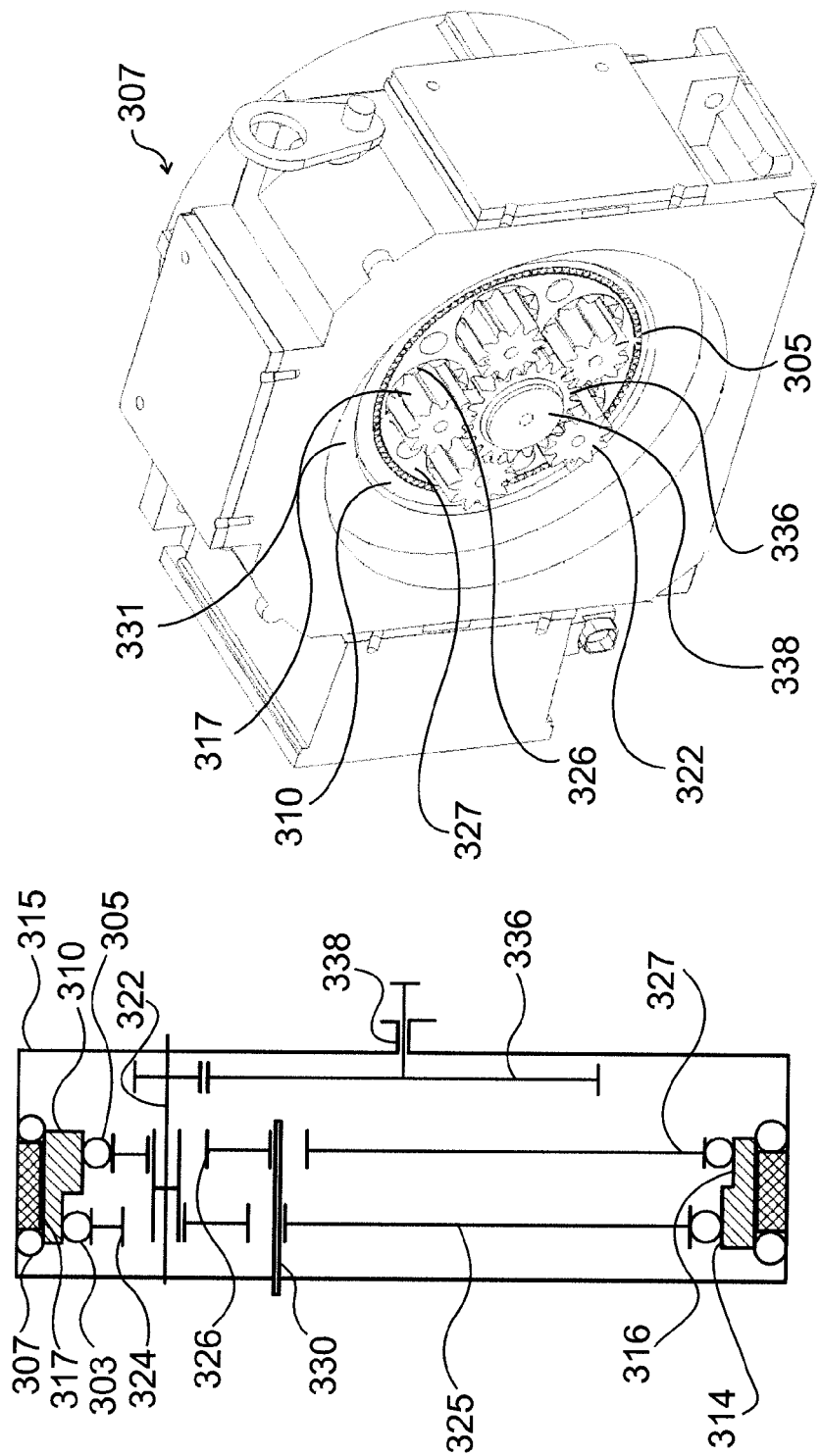

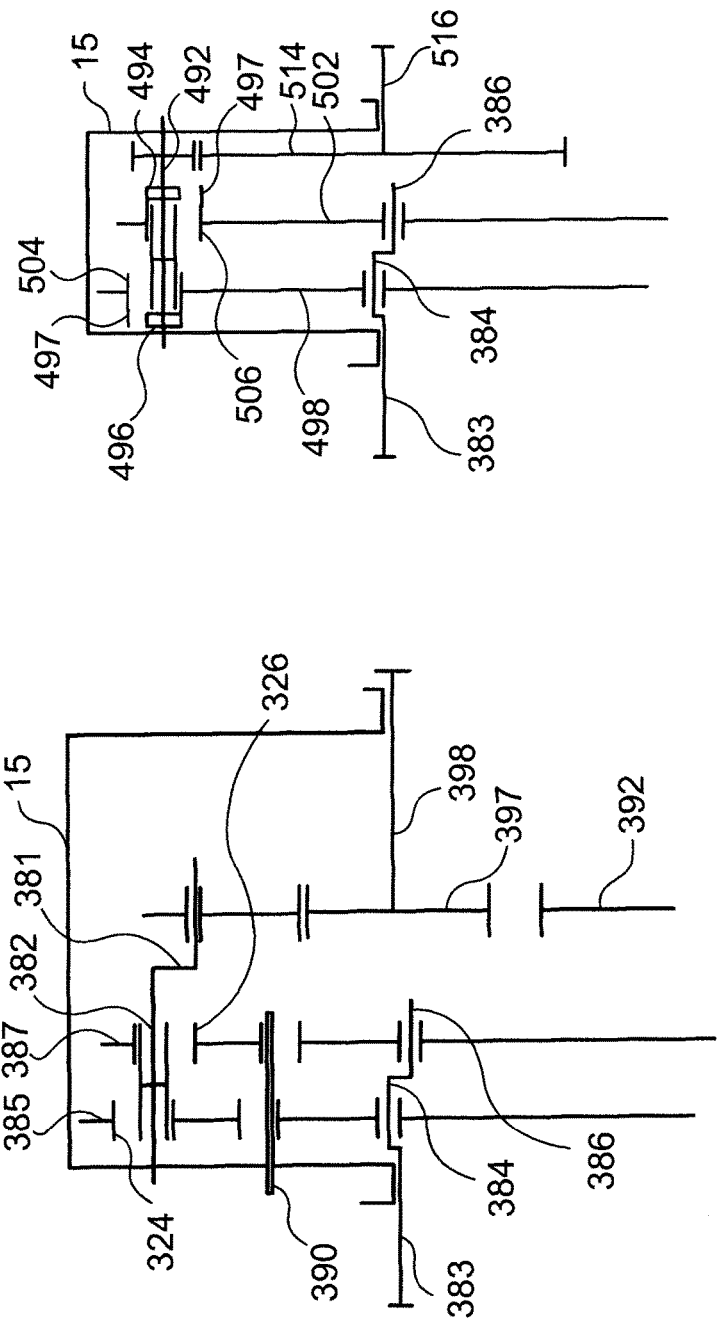

DRIVE MECHANISM

This application claims priority, under Section 371 and/or as a continuation under Section 120, to PCT Application No. PCT/HU2015/000079, filed on Dec. 16, 2015, which claims priority to Hungarian Application No. P1400594, filed on Dec. 16, 2014.

Also, the present application incorporates by reference, in its entirety, PCT Application No. PCT/HU2015/000079.

TECHNICAL FIELD

The invention relates to a drive mechanism adapted for transmitting rotating motion.

BACKGROUND ART

A number of drive mechanisms adapted for transmitting rotating motion are known, and there is persistent demand for improving such drive mechanisms.

In GB 926,266 a drive mechanism is disclosed that has an input driving shaft comprising an eccentrically offset (shifted) section. A disc is connected by bearing to the eccentrically offset section of the input driving shaft such that the disc is able to rotate about the eccentrically shifted section. The disc has cylindrical through holes receiving driving-shafts secured to the housing of the drive mechanism. Upon rotation of the input driving shaft the driving-shafts guide the disc such that certain points thereof undergo a purely circular motion, and thereby the disc undergoes a so-called wobbling motion. External toothing is arranged on the periphery of the disc, by means of which the wobbling motion of the disc drives the gear-wheel, which surrounds the disc, through the internal toothing of the gear-wheel. The driven external gear-wheel is directly connected to an output driving shaft. To provide for the desired motion of the disc balance weights are secured thereto. The approach according to the document has the disadvantage that the gear-wheel driven by wobbling motion is directly connected to the output driving shaft, and thus the achievable transmission ratio range is very narrow.

In U.S. Pat. No. 4,674,361 and U.S. Pat. No. 4,958,531 rotation transmitting mechanisms are disclosed wherein an input driving shaft connected eccentrically to a plate can be applied to rotate the output driving shaft connected with an eccentrical offset to the plate at a different location. To provide the desired output driving it is required that at least one further driving-shaft is connected to the plate, also in an eccentrically offset manner. A similar approach is disclosed in U.S. Pat. No. 5,324,240.

In WO 2011/137469 A1 a drive mechanism having epicycloidal (planetary) wheel is disclosed which comprises an input driving shaft having one or more sections eccentrically shifted relative to the shaft. One or more rotatable discs are connected to the one or more eccentrically shifted sections, respectively. Internally toothed trough holes are arranged on a circumference of the disc, into which openings externally toothed epicycloidal wheels having a teeth number different from the teeth number of the openings are received. The epicycloidal wheels roll down on output gear-wheels implemented as internally threaded gears and being connected to another, also externally toothed section of the epicycloidal wheels. These portion of the epicycloidal wheels are also connected to an externally toothed gear-wheel. One of the output gears is connected to the rear wall of the drive mechanism. As can be seen also in FIG. 3c of the document, the epicycloidal wheels are not connected to this rear wall, and thereby the epicycloidal wheels are able to roll down at a given circumference of the rear wall. Accordingly, the discs are rotated with respect to the output gears upon driving the epicycloidal wheels, therefore, in the drive mechanism according to WO 2011/137469 A1 wobbling motion cannot be established on the discs, but instead other planet motion types occurring also in other planetary drive mechanisms will be realized therein.

The approach according to WO 2011/137469 A1 is mainly suitable for realizing large transmission ratios. The drive mechanism according to the document has a power flow that is unfavourable from the aspect of the value of efficiency.

In EP 291052 A2 a drive mechanism is disclosed wherein the gear-wheels roll down on a single stationary ring gear arranged coaxially with the input driving shaft, that is, the gear-wheels undergo a substantially planetary motion The pin guides utilized in this solution undergo orbital motion relative to the housing, and the angular velocity of the output driving shaft corresponds to the speed of this orbital motion.

In U.S. Pat. No. 3,129,611 a drive mechanism is disclosed that comprises multiple epicycloidal wheels arranged behind one another in an axial direction. The pins utilized in this approach undergo orbital motion relative to the housing, and the angular velocity of the output driving shaft corresponds to the speed of this orbital motion.

In U.S. Pat. No. 3,994,187, disclosing a similar approach, also planetary motion appears. In this approach the shafts comprise eccentric sections that are not secured to the housing, which, in a disadvantageous manner, greatly increases friction. A similar drive mechanism is disclosed in U.S. Pat. No. 5,655,985. A planetary-type motion appears also in EP 0551918 A2.

In DE 3810824 A1, DE 2731486 A1, U.S. Pat. No. 5,145,467, U.S. Pat. No. 4,896,567, U.S. Pat. No. 5,697,868, US 2014/0031165 A1 and U.S. Pat. No. 7,597,643 B2 drive mechanisms comprising eccentric shafts are disclosed. In WO 97/42431 A1 differential drives and transmission mechanisms comprising multiple trochoidal tooth output driving shafts are disclosed.

In light of the known solutions, there is a demand for a drive mechanism that can realize a wide range of accelerator and reduction transmission ratios gears.

DESCRIPTION OF THE INVENTION

The primary object of the invention is to provide a drive mechanism which is free from disadvantages of prior art solutions to the greatest possible extent.

A further object of the invention is to provide a drive mechanism that can realize a wide range of accelerating and reduction transmission ratios, particularly by the appropriate selection of the number of teeth of the engaging gear-wheels of the drive mechanism.

In certain embodiments the object of the invention is to provide a drive mechanism wherein power branching can be provided and which has favourable power transmission characteristics. In its other embodiments a further object of the invention is to provide—with or without power branching—such drive mechanisms wherein—due to the construction of the drive mechanism—the load of the teeth of the gear-wheels in the drive mechanism are minimized.

The object of still further embodiments of the invention is to provide a drive mechanism wherein, in addition to fulfilling at least some of the above objectives, the transmission ratio between the input driving shaft and output driving shaft can be selected from more than one transmission ratios.

In certain embodiments, the object of the invention is to provide a drive mechanism that can be advantageously applied in combination with an electric motor.

The objects of the invention can be achieved by the drive mechanisms according to claims 1 and 22. Preferred embodiments of the invention are defined in the dependent claims.

The drive mechanism according to the invention is capable of realizing a wide range of transmission ratios between the RPMs (revolutions per minute) of the input and output driving shafts, preferably also providing a possibility for power branching and summing, having a power flow free from internal power circulation that would deteriorate efficiency, whether it is implemented as a fixed transmission ratio drive or as a drive with variable transmission ratio.

The fundamental difference between the drive mechanism disclosed in WO 2011/137469 A1 and the drive mechanism according to the invention is that in the approach disclosed in WO 2011/137469 A1, the discs rotated by the eccentric shaft section can be freely rotated about their own respective axes, thereby undergoing rotational rather than purely wobbling motion. Accordingly, in further sections of the drive mechanism according to WO 2011/137469 A1 also such motion types occur that are significantly different from the motion type observable in the drive mechanism according to the invention.

BRIEF DESCRIPTION OF THE DRAWINGS

Preferred embodiments of the invention are described below by way of example with reference to the following drawings, where FIG. 1 is a side sectional drawing illustrating an embodiment of the drive mechanism according to the invention, FIG. 2A shows an A-A section view (shown in FIG. 1) of the embodiment illustrated in FIG. 1, illustrating a first time instant of its motion, FIG. 3 is a B-B sectional drawing (see FIG. 1) of the embodiment shown in FIG. 1, FIG. 15 is a sectional drawing illustrating a further embodiment of the drive mechanism according to the invention, FIG. 16 is a schematic drawing illustrating a further detail of the embodiment of the drive mechanism according to the invention shown in FIG. 15, FIG. 19 is a schematic drawing illustrating a further embodiment of the invention, FIG. 20 is a spatial drawing illustrating the embodiment of the invention shown in FIG. 19 built into a motor, FIG. 33 is a schematic drawing illustrating a further embodiment of the invention, and FIG. 34 is a schematic drawing illustrating a yet further embodiment of the invention.

MODES FOR CARRYING OUT THE INVENTION

Figure 2B:
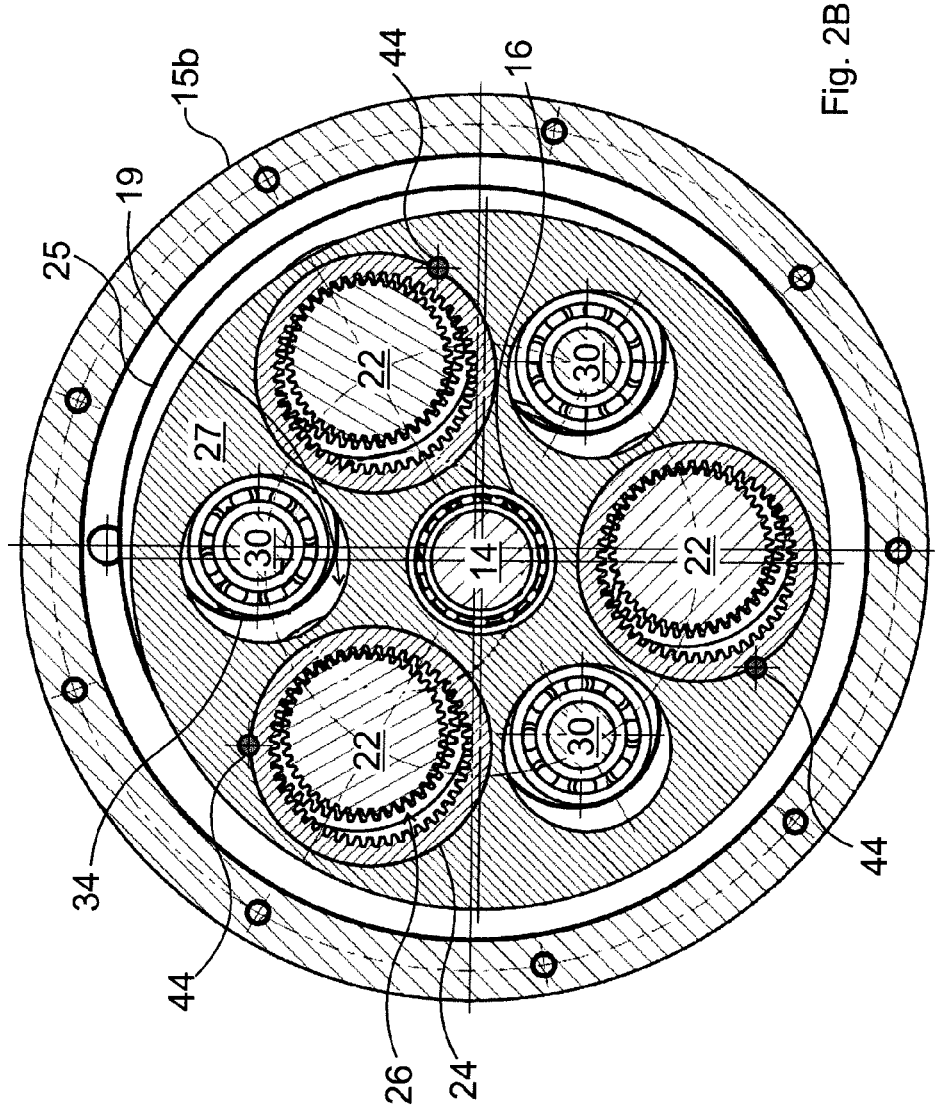
FIG. 2B illustrates a second time instant of motion in the section view shown in FIG. 2A.

In FIG. 1 an embodiment of the drive mechanism according to the invention, adapted for transmitting rotating motion, is shown. The drive mechanism according to the invention comprises a drive mechanism housing 15 and a first shaft 10 rotatably connected the drive mechanism housing 15, an eccentric shaft section (in this embodiment, a first eccentric shaft section 14, and a second eccentric shaft section 18) being parallel with the first shaft 10 and being offset with respect to first shaft 10 by an eccentricity parameter value. Said eccentric shaft section is connected in this embodiment to the end of the first shaft 10 being at the drive mechanism housing 15. In the present embodiment, the drive mechanism comprises a pair of wobbling discs 27, 25 rotatably connected to the first eccentric shaft section 14 and to the second eccentric shaft section 18, respectively, as well as wobbling gear-wheels 24, 26 connected by means of a fixed or a releasable connection to the wobbling discs 27, 25 and having axes parallel with the first shaft 10. The fixed connections can be formed in every case such that a second unit connected to a first unit is formed or machined from the material of the first unit.

In the present, single-stage embodiment each of the wobbling gear-wheels 24, 26 is connected, preferably by a fixed connection, to the wobbling discs 27 and 25, respectively. The fixed connections can be formed by machining the wobbling gear-wheels 24, 26 from the material of the wobbling discs 27, 25, i.e. the wobbling gear-wheels and the corresponding wobbling disc are formed as a single piece. As shown in FIG. 1, the drive mechanism housing 15 is assembled from drive mechanism housing portions 15a, 15b, 15c by means of fastening elements. For example, in the embodiment according to FIGS. 7 to 10, and also in other preferred embodiments, the invention is implemented applying a single wobbling disc.

In the drive mechanism according to the invention the axes of the wobbling gear-wheels 24 and 26 are offset with respect to the axes of the eccentric shaft sections 14 and 18. The arrangement of the wobbling gear-wheels 24 and 26 is shown in FIG. 2A, where the offset position of their axes on the wobbling disc 27 with respect to the eccentric shaft section 14 can be clearly seen. The wobbling gear-wheels 24 (and similarly, the arrangement of the wobbling gear-wheels 26 on the wobbling disc 25) are arranged on the wobbling disc 27 is such a way that their axes surround the eccentric shaft section 14 (this is in contrast with the approach according to GB 962,266 wherein the axis of the single gear, arranged on the periphery of a disc guided by through shafts and adapted to be driven by wobbling motion, is coincident with the axis of the eccentric shaft section connected to the disc in the middle thereof). If the wobbling gear-wheels 24 have their respective axes arranged this way, i.e. shifted (being offset) with respect to the centre of the wobbling disc 27 coinciding with the axis of the eccentric shaft section 14, it is possible to arrange more than one wobbling gear-wheels 24, and thereby to achieve branching of the power transmitted by the drive mechanism. In case of such power branching the drive mechanism according to the invention can attain very favourable (almost 100%) power transmission ratio.

A further advantage of the present embodiment is that, in case the wobbling gear-wheels have their axes offset with respect to the axes of the respective eccentric shaft sections, the rotating motion can be taken out from the transmitting gear-wheels connected to the wobbling gear-wheels even directly to the side where the input driving shaft is connected, i.e. the input and output driving shafts can be arranged side by side on the same side of the drive mechanism housing. Such arrangement have the further advantage that rotating motion can be directly taken out from the transmitting gear-wheels also to both sides of the drive mechanism housing. These arrangements may be advantageously applied in a number of fields. This offset arrangement of the transmitting gear-wheels also results in that the first toothing of the transmitting gear-wheel can be arranged in the same plane as the eccentric shaft section, and therefore the present embodiment can be implemented in a space-saving manner.

The drive mechanism according to the invention further comprises a transmitting gear-wheel 22 having an axis of rotation being parallel with the axis of the wobbling gear-wheel 24 at a distance therefrom determined by the eccentricity parameter value, being connected to the drive mechanism housing 15 as being rotatable around its axis of rotation, having a first toothing 28 (shown in FIG. 1) with a teeth number being different from the teeth number of each wobbling gear-wheel 24, 26, and connected to (engaging) the wobbling gear-wheels 24, 26 with its first toothing 28.

As it is shown also in FIG. 2A, the rotational axis of the transmitting gear-wheel 22 is offset (shifted) with respect to the axis of the wobbling gear-wheel 24 by an amount corresponding to the eccentricity parameter, providing that the transmitting gear-wheel 22 will roll down on the wobbling gear-wheel 24 along the toothing thereof in a stress-free manner upon motion of the eccentric shaft section 14.

In this embodiment the teeth number of the first toothing 28 of the transmitting gear-wheel 22 is smaller than the teeth number of the wobbling gear-wheels 24 and 26. In case the difference between the teeth numbers is one, upon rotation (rotating motion) of the first shaft 10 the revolutions per minute (rotational speed) of the transmitting gear-wheels 22 can be reduced to the greatest possible extent with respect to the speed of the first shaft 10; if, by way of example, the teeth number of the first toothing 28 of the transmitting gear-wheel 22 is 30, then—since the difference between the numbers of teeth is one—the revolutions per minute (RPM) parameter can be reduced to $\frac{1}{30}$ of the original RPM.

The drive mechanism according to the invention further comprises a guiding connection establishing (generating), upon motion of the first shaft 10, wobbling motion of the wobbling discs 25, 27 together with the connection between the wobbling gear-wheel 24, 26 and the transmitting gear-wheel 22 and having an axis being offset (shifted) with respect to the axis of the eccentric shaft sections 14, 18. As it is shown also in FIG. 1, it is provided that the transmitting gear-wheel 22 is rotatable with respect to the drive mechanism housing 15 by connecting the transmitting gear-wheel 22 to the drive mechanism housing 15 by means of a bearing. To achieve this—as it will be shown in relation to other embodiments—it may be sufficient to apply a single bearing, i.e. it is not inevitably necessary to connect the transmitting gear-wheels to the drive mechanism housing by means of bearings at both of its ends. Through connecting the transmitting gear-wheel 22 to the drive mechanism housing 15 by means of a bearing it can be preferably also provided that the transmitting gear-wheel 22 cannot undergo other types of motion, i.e. it can only undergo rotating motion with respect to the drive mechanism housing 15.

In the embodiment shown in FIG. 1 the drive mechanism further comprises a second shaft 38 rotatably connected to the drive mechanism housing 15 and being parallel with the first shaft 10 and is, and a collecting gear-wheel 36 connected to the end of the second shaft 38 being at the drive mechanism housing 15, and having a rotational axis parallel with the second shaft 38. The transmitting gear-wheel 22 comprises a second toothing 31 connected to (engaging) the collecting gear-wheel 36 and being connected to the first toothing 28 by means of a fixed or a releasable connection. Since in this embodiment only a single stage is implemented, the second toothing 31 is connected to the transmitting gear-wheel 22, and thus also to the first toothing 28 thereof, preferably by a fixed connection.

In the drive mechanism configured according to FIG. 1, in case the first shaft 10 is rotated with a high speed, i.e. it is operated as a fast rotating input driving shaft, the second shaft 38 functions as a slowly rotating shaft. In a similar fashion, the second shaft 38 can be operated as a slowly rotating input driving shaft, in which case the first shaft 10 functions as a fast rotating output driving shaft.

In the present embodiment the first shaft 10 and the second shaft 38 are arranged coaxially with each other. Also, in the present embodiment the second toothing 31 of the transmitting gear-wheel 22 is an external toothing, and the collecting gear-wheel 36 has also an external toothing. As it will be explained later on in relation to some embodiments, also such embodiments are conceivable wherein the collecting gear-wheel is internally toothed and is connected by means of the internal toothing to the second toothing of the transmitting gear-wheel, implemented as an external toothing.

Figure 5:
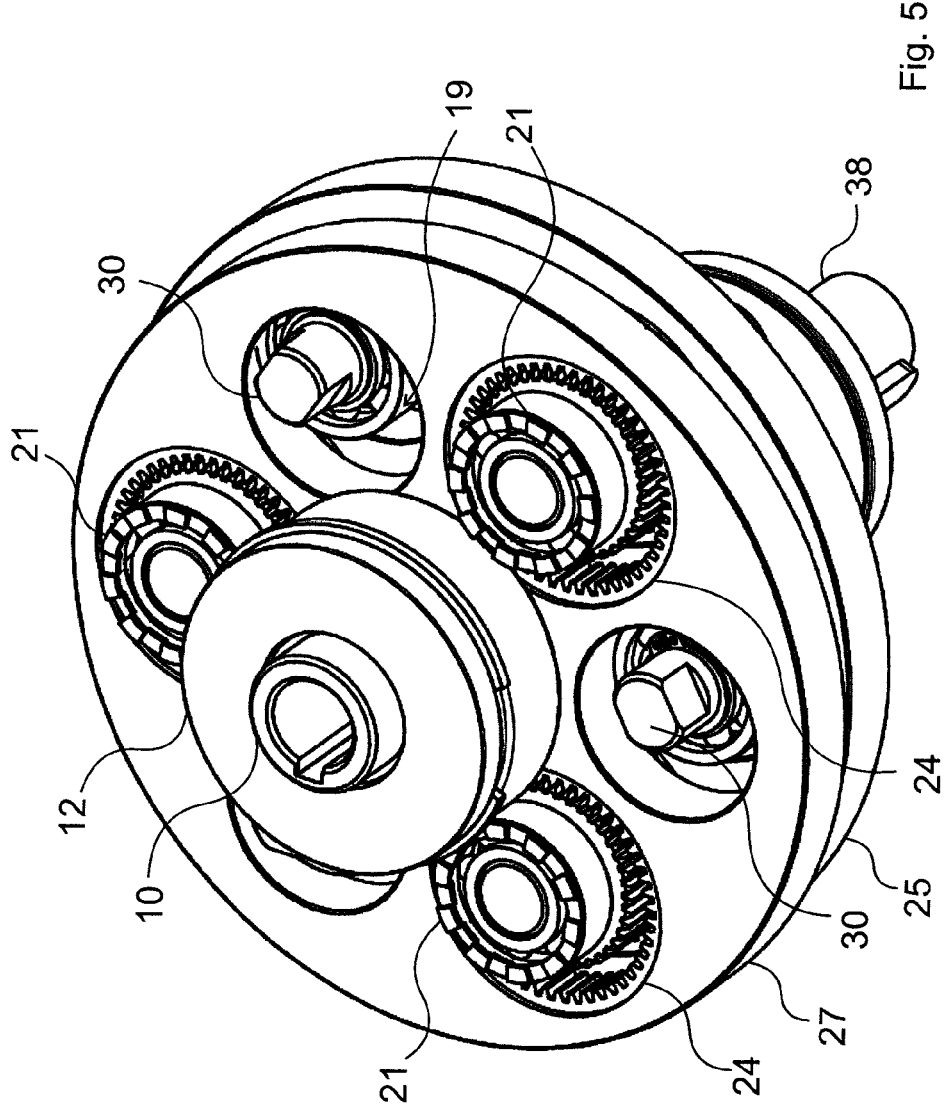
FIG. 5 is a further spatial drawing illustrating the embodiment shown in FIG. 1 without the drive mechanism housing.

In this embodiment the transmitting gear-wheel 22 is configured such that the first toothing 28 and the second toothing 31 are arranged on a single shaft one after the other, with each end of the shaft being connected by a respective bearing 23, 29 to the drive mechanism housing 15 as shown in FIG. 1. To provide for pre-tensioning of the bearing 23, a compensation member 21 is arranged at the end of the transmitting gear-wheel 22 at the first toothing 28 as shown in the figure (the compensation member 21 is also shown in FIG. 5). In FIG. 2A, corrsponding to the embodiment of FIG. 1, it is illustrated that in the present embodiment three transmitting gear-wheels 22 are arranged, preferably all three being connected to the drive mechanism housing 15 in a manner illustrated in FIG. 1.

Since the transmitting gear-wheel 22 is rotatably connected to the drive mechanism housing 15, by arranging the transmitting gear-wheel 22 according to the invention it can be achieved—utilising an additional guiding connection—that the wobbling discs 24, 26 undergo a purely wobbling motion. As it will be explained later on, the guiding connection can be implemented in a number of different ways.

However, if, as in case of the arrangement according to the invention, the axes of the wobbling gear-wheels are not coincident with the corresponding axes of those wobbling discs 25, 27 to which they are connected, i.e. with the axes of the corresponding eccentric shaft sections 14, 18, then in order to establish the wobbling motion, at least two guiding connections are required, one of which is invariably the transmitting gear-wheel 22.

In this embodiment, therefore, both a first shaft 10 and a second shaft 38 are connected to the drive mechanism housing 15. It is provided by the structural arrangement of the drive mechanism according to the invention that the first shaft 10 and the second shaft 38 is equally able to function as an input driving shaft and as an output driving shaft, i.e. the drive mechanism according to the invention may be driven via any of its shafts.

The drive mechanism according to the invention does not necessarily comprise a second shaft, the rotating motion of the transmitting gear-wheel 22 may not only be utilized (harnessed) with the help of a second shaft, as well as the transmitting gear-wheel or transmitting gear-wheels can be driven by other means, i.e. it is not necessary to include a second shaft for driving the transmitting gear-wheels. Besides that, the second shaft can be connected directly to the transmitting gear-wheel or transmitting gear-wheels; i.e. more than one input driving shafts or more than one output driving shafts can optionally be included in the drive mechanism according to the invention. The selection of the output driving can be dependent also on the transmission ratio to be achieved utilising the drive mechanism; the transmission ratio range that can be realized applying the drive mechanism according to the invention is therefore widened by the possibility to select the output driving.

In the embodiment of FIG. 1 the drive mechanism according to the invention has a fixed transmission ratio, i.e. the transmission ratio cannot be changed (changing the transmission ratio would require replacing components), in contrast to the embodiments of FIGS. 15 to 18. In the embodiment according to FIG. 1, the first shaft 10 may e.g. be a fast rotating input driving shaft. In this embodiment, eccentric shaft sections 14, 18 are also connected to the first shaft 10. As it is shown also in FIG. 1, the shaft sections 14 and 18 are eccentrically offset in opposite directions with respect to the first shaft 10. The eccentric shaft sections 14, 18 also have a circular cross section, but the centres of the corresponding circles are shifted with respect to the rotational axis of the first shaft 10 driving the eccentric shaft sections 14, 18. The wobbling discs 27 and 25 are rotatably connected (in the present embodiment, by bearings 16 and 20) to the eccentric shaft sections 14, 18.

In certain embodiments of the invention, as in the embodiment of FIG. 1 the guiding connection is established by means of at least one additional wobbling gear-wheel—in this embodiment, two additional wobbling gear-wheels 24 (and wobbling gear-wheels 26 arranged on the other wobbling disc)—and the transmitting gear-wheel 22 connected thereto. In the present embodiment two additional transmitting gear-wheels 22 are connected to the additional wobbling gear-wheels 24, 26.

In the present embodiment the drive mechanism preferably comprises three wobbling gear-wheels 24, 26 arranged symmetrically on the wobbling discs 25, 27 around the eccentric shaft sections 14, 18, and transmitting gear-wheels 22 connected to the wobbling gear-wheels. Of course, more than three wobbling gear-wheel 24, 26—transmitting gear-wheel 22 connection can also be arranged—preferably symmetrically around the corresponding eccentric shaft sections. The application of three such interconnections is preferable because it allows for sharing the power to be transmitted among the interconnections, while at the same time the structure of the drive mechanism remains not overly complicated.

In the embodiment illustrated in FIG. 1 the wobbling gear-wheels 24, 26 have internal toothing, while the first toothing 28 of the transmitting gear-wheel 22 is formed as an external toothing. Also in this embodiment a first eccentric shaft section 14 and a second eccentric shaft section 18, being offset with respect to first shaft 10 in opposite directions by the same eccentricity parameter value, are connected one after the other to the first shaft 10, a first wobbling disc 27 is rotatably connected to the first eccentric shaft section 14 and a second wobbling disc 25 is rotatably connected to the second eccentric shaft section 18, and first wobbling gear-wheels 24 and second wobbling gear-wheels 26 having identical configurations are connected in the same manner to the first wobbling disc 27 and to the second wobbling disc 25, respectively, with fixed or releasable connections.

In an embodiment the drive mechanism according to the invention the guiding connection is formed by at least one driving-bore arranged in the wobbling discs and by a driving-shaft connected to the wall of the at least one driving-bore by means of rotation-enabling connection, and the driving-shaft extending into the driving-bore has an axis of symmetry being offset by the eccentricity parameter value from the central axis of the driving-bore in a direction opposite to the eccentric offset (shift) of the eccentric shaft section. The driving-bores have circular cross section.

In a conceivable embodiment of the invention the rotation-enabling connection is formed by a rotatable connection arranged around the driving-shaft, the part of the rotatable connection, being rotatable around the driving-shaft, is supported against the wall of the driving-bore. The rotation-enabling connection between the driving-shaft and the driving-bore may also be implemented such that the driving-shaft is rotatably connected (i.e., by way of example, by bearings) to the drive mechanism housing, and the driving-shaft, which accordingly has a larger diameter, is directly supported against the wall of the driving-bore. Since in this case the driving-shaft is rotatable and is inserted into the driving-bore, it can perform the same function as the driving-shaft 30 illustrated in the embodiments of FIGS. 1 to 5.

The drive mechanism according to the invention is different from the solution according to GB 926 266 also in that according to the present invention the two elements appearing separately in GB 926 266, namely, the driving-shaft and the element driven by wobbling motion, are integrated in a single component, the transmitting gear-wheel.

In the embodiment of FIG. 1 three driving-shafts 30 are arranged in the driving-bores 19 formed in the wobbling discs 25, 27. As shown in FIG. 1, in the present embodiment the rotation-enabling connection is realized by bearings 32, 34 arranged around the driving-shafts 30 in the driving-bores 19. In this embodiment, therefore, the driving-shaft 30 is connected to the wobbling discs 27, 25 by the bearings 34 and 32, respectively. The outer ring of the bearings 32 and 34 is supported against the side wall of the driving-bores 19; during the wobbling motion of the wobbling discs 25, 27 the bearings 32, 34 are rotated about the driving-shaft 30, while being supported in the wobbling discs 25, 27 against the wall portions of the driving-bores 19 that face the same direction as the wall portions of the wobbling gear-wheels 24, 26 to which the transmitting gear-wheels 22 are connected at the given moment. As shown in FIG. 1, the ends of the driving-shafts 30 are connected to the corresponding portions of the drive mechanism housing 15. The driving-shafts 30 preferably cannot be rotated with respect to the drive mechanism housing 15; however, thanks to the rotatable connection, that is, in this embodiment, to the bearings 32, 34 arranged about the driving-shaft 30, the wobbling discs 25, 27 can be rotated around the driving-shafts 30 during their wobbling motion such that the outer portions of the bearings 32, 34 are supported against the wall of the driving-bores 19 at all time instances.

In a given embodiment, the guiding connection may be formed (realized) in multiple different ways at the same time. In the embodiment according to FIG. 1, as the drive mechanism comprises three transmitting gear-wheel 22, the guiding connection is formed by the connection between the wobbling gear-wheels 24, 26 and the transmitting gear-wheel 22. Besides that, however, a guiding connection is formed also by the driving-bores 19 and the driving-shafts 30 arranged therein, the driving-shafts 30 is encompassed in rotatable connections.

It is preferable to provide the guiding connection in multiple ways (as shown in FIG. 1) because this way each connection between the wobbling discs 24, 26 and the transmitting gear-wheel 22 is subjected to a proportionally lower load. However, it is not preferred to "oversecure" the guiding connection, since above a certain number a further guiding connection does not provide significant load reduction on the teeth of the wobbling gear-wheels 24, 26 and the transmitting gear-wheels 22, but makes the structural arrangement of the drive mechanism complicated. To provide for the wobbling motion of the discs 25, 27 it is sufficient to arrange a single connection between wobbling gear-wheels 24, 26 and transmitting gear-wheels 22 (as described in detail above), and a single further guiding connection; i.e. in case one wobbling gear-wheel 24, one wobbling gear-wheel 26, and one transmitting gear-wheel 22 (connected to both wobbling gear-wheels) are applied, it is sufficient to further arrange a guiding connection formed by a single driving-bore 19 and a single driving-shaft 30.

Our experiments have shown that by symmetrically arranging three transmitting gear-wheels 22, the loads of teeth connections (engagements) between the wobbling gear-wheels 24, 26 and the transmitting gear-wheels 22 are already significantly reduced, and the shafts 10 and 38 can be easily rotated with respect to each other. According to our experiments—taking into account the loads to which engaging teeth are subjected and the extra costs of including further transmitting gear-wheels 22—it has been found that the arrangement according to FIG. 1, comprising three transmitting gear-wheels 22 and three driving-shafts 30, is optimal.

FIG. 1 also shows that in this embodiment the first shaft 10 is rotatably connected to the drive mechanism housing 15 by means of a bearing 12. The bearing 12 positioned with respect to the drive mechanism housing 15 utilising a ring 202 arranged to the left of the bearing 12 (as seen in the drawing) being a Seeger ring. A gasket 204, encompassing the first shaft 10, is connected to the ring 202 from the direction of the outside of the drive mechanism housing 15. In a similar manner, a ring 206 and a gasket 208 are arranged around the second shaft 38. The second shaft 38 is connected to the drive mechanism housing 15 by bearings 40 and 42. The inclusion of two bearings 40 and 42 is advantageous especially because it allows the second shaft 38 to take particularly high loads. FIG. 1 also shows a fixation element 46, with the help of which it can be provided that the collecting gear-wheel 36 is not rotated with respect to the second shaft 38.

As shown in FIG. 2A, in this embodiment the drive mechanism according to the invention comprises wobbling gear-wheels 24 that are internally toothed gear-wheels. These internally toothed wobbling gear-wheels 24 are connected to the wobbling discs 25, 27 by means of fixation elements 44. If the fixation elements 44 are made removable—expediently by applying some kind of release mechanism—then a releasable connection is provided between the wobbling gear-wheels 24, 26 and the wobbling discs 25, 27. The fixation element 44 may be arranged in a fixed manner, in which case there is a fixed connection between the wobbling discs 25, 27 and the wobbling gear-wheels 24, 26. The wobbling gear-wheels 24, 26 may optionally be machined or formed from the material of the wobbling discs 25, 27, in which case they are interconnected by a fixed connection.

According to the above, in the present embodiment the wobbling gear-wheels 24, 26 may be implemented as follows. First, through bores are made in the wobbling discs 25, 27 at appropriate positions. The wobbling gear-wheels 24, 26 are then inserted in the bores. Applying the fixation elements 44 as shown in the figure it is provided that the wobbling gear-wheels 24 cannot be rotated inside the bore, i.e. that they assume a fixed position with respect to the wobbling disc 27. Preferably the wobbling gear-wheels 24, 26 are either connected to each of the wobbling discs 25, 27 at the same radius, or they are machined from the wobbling discs 25, 27.

In the present embodiment both the first toothing 28 and the second toothing 31 of the transmitting gear-wheel 22 are external toothings that are interconnected like shafts in the transmitting gear-wheel 22. Accordingly, the second toothing 31 is preferably machined from the shaft of the transmitting gear-wheel 22. The transmitting gear-wheel 22 may also be formed such that the first toothing 28 and/or the second toothing 31 are connected to a shaft (i.e. they are not machined from the material itself). Such configuration of the transmitting gear-wheel 22 provides that the first toothing 28 and the second toothing 31 rotate simultaneously, i.e. in this embodiment they cannot be rotated with respect to one another. In the embodiments shown in FIGS. 15 to 18 also such variations are disclosed wherein the first toothing and the second toothing of the transmitting gear-wheel are not co-rotated because they are interconnected in a releasable manner.

Figure 2C:
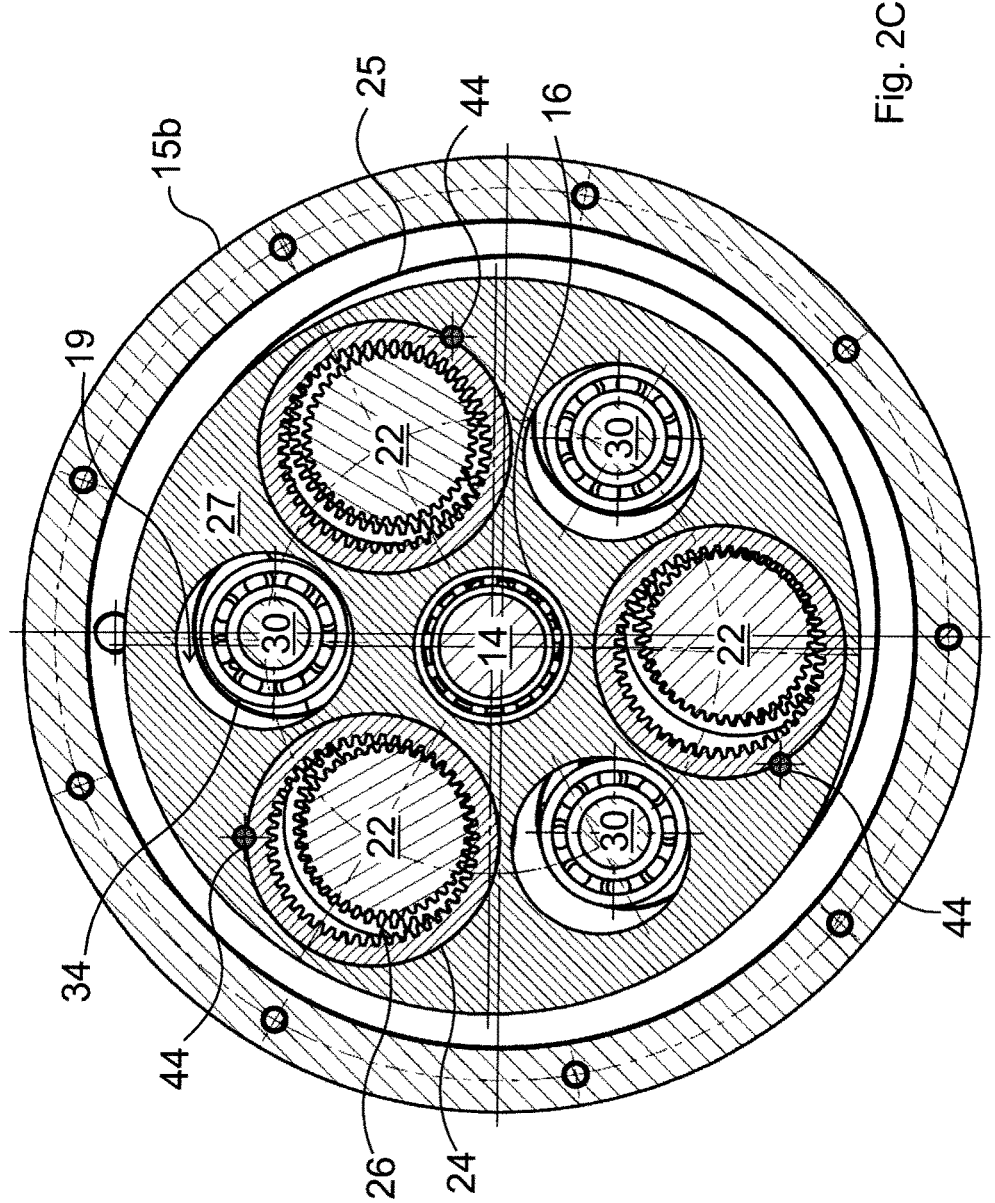
FIG. 2C illustrates a third time instant of motion in the section view shown in FIG. 2A.

Thanks to the arrangement of the transmitting gear-wheels 22 and the optionally included driving-shafts 30, during the rotation of the first shaft 10 the wobbling discs 25, 27 undergo translatory motion along a circular path, i.e. they undergo a so-called purely wobbling motion. The wobbling motion is illustrated by FIGS. 2A to 2C by show certain phases of the wobbling motion. The wobbling gear-wheels 24 connected to the wobbling discs 25, 27 induce the motion to the transmitting gear-wheels 22 that can be rotated with respect to the drive mechanism housing 15 only about their own axes of rotation. Due to the ratio of the teeth number of the wobbling gear-wheel 24 and the first toothing 28 of the transmitting gear-wheel 22 a transmission ratio is established between the first shaft 10 and the transmitting gear-wheels 22, and according to that transmission ratio the transmitting gear-wheels 22 rotate slower than the first shaft 10 in the arrangement according to FIGS. 2A to 2C. The second toothing 31 of the transmitting gear-wheels 22, connected to the collecting gear-wheel 36, rotate the collecting gear-wheel 36 with a speed determined by the transmission ratio resulting from the ratio of the teeth number of the second toothing 31 and the collecting gear-wheel 36, while the collecting gear-wheel 36 induces the rotation of the second shaft 38. The first toothing 28 may have preferably the same teeth number as the second toothing 31.

FIG. 2A shows in a first phase of the wobbling motion the wobbling disc 27 and the components connected thereto. In this phase the first toothing 28 of the transmitting gear-wheels 22 and the bearings 34 arranged around the driving-shafts 30 engage the upper portions (according to the figure) of the corresponding components (the wobbling gear-wheel 24 and the driving-bore 19). In a manner shown also in FIG. 1 (because FIG. 2A shows the section A-A of FIG. 1), in this position the axis of the eccentric shaft section 14 is located below the first shaft 10 (as shown in FIG. 1). Accordingly, in FIG. 2A the bottom portion of the wobbling disc 27 is closer to the drive mechanism housing portion 15b than the upper portion thereof. In FIG. 2A the motion of the wobbling disc 25 can also be observed. As it is shown also in FIG. 1, the axis of the eccentric shaft section 18 connected to the wobbling disc 25 is located above (according to FIG. 1) the axis of the first shaft 10, with the upper portion of the wobbling disc 25 being located closer to the drive mechanism housing portion 15b. FIG. 2A also partially shows the contours of the wobbling gear-wheels 26 and the driving-bores 19 formed in the wobbling disc 25.

In FIG. 2B a second phase of the wobbling motion is illustrated. By this phase the wobbling gear-wheels 24, 26 have already rotated the transmitting gear-wheel 22 to a small extent relative to the position shown in FIG. 2A, that is, their teeth have rolled relative to one another. Similarly, the bearings 34 around the driving-shafts 30 have also been rotated with respect to the position of FIG. 2A. Due to this displacement the left-down portion (according to FIG. 2B) of the wobbling disc 27 is now located nearest to the drive mechanism housing portion 15b, the right-up portion (according to FIG. 2B) of the wobbling disc 25 being nearest to the same housing portion.

In the third phase shown in FIG. 2C the wobbling discs 25 and 27 are rotated further, resulting in that the left-up portion of the wobbling disc 27 is located nearest to the drive mechanism housing portion 15b, with the right-down portion of the wobbling disc 25 becoming nearest to the same portion.

According to the above reasons, as it can also be observed in FIGS. 2A-2C, with the arrangement of the components according to the invention the wobbling discs 25, 27 will undergo purely wobbling motion, i.e. any given point of the wobbling discs 25, 27 will describe a circle with respect to the first shaft 10. By means of this wobbling motion the wobbling discs 25, 27 rotate the transmitting gear-wheels 22 upon the rotation of the first shaft 10, while the transmitting gear-wheels 22 turn the output driving shaft or shafts.

Thanks to the arrangement of the eccentric shaft section 14, the wobbling disc 27 and the components connected thereto (transmitting gear-wheel 22, wobbling gear-wheel 24, driving-bore 19, driving-shaft 30 and the bearing 34 arranged around it) shown in FIGS. 2A-2C, in case these components are in a stationary position, the wobbling disc 27 cannot be displaced laterally (according to the figure), i.e. it has no play (backlash).

In the above discussion explaining the present embodiment referring to FIGS. 2A-2C the first shaft 10 was considered to behave as an input driving shaft. It may, however, also be contemplated that an input driving shaft rotates the transmitting gear-wheel 22, in which case it is the gear-wheels 22 that induce the wobbling motion of the wobbling discs 25, 27, which will rotate the first shaft 10 with the help of the eccentric shaft sections 14, 18.

FIG. 3 shows the B-B section of FIG. 1. In the figure the collecting gear-wheel 36 and the second toothing 31 of the transmitting gear-wheel 22 connected therewith are shown. As it is shown also in FIG. 3, the collecting gear-wheel 36 has a higher teeth number than the second toothings 31, and thereby the collecting gear-wheel 36 will move a lot more slowly than the transmitting gear-wheel 22 does.

Accordingly, in this embodiment the transmitting gear-wheels 22 rotate a lot more slowly relative to the first shaft 10, and by connecting the second toothing 31 and the collecting gear-wheel 36 in a manner shown (applying the teeth numbers shown in the figure) a further speed reduction relative to the transmitting gear-wheels 22 can be achieved on the second shaft 38.

An embodiment is also conceivable wherein the second toothing 31 has a higher teeth number than the collecting gear-wheel 36, in which case a 're-acceleration' effect can be obtained, i.e. the transmitting gear-wheel 22 will rotate slower than the first shaft 10 but the second shaft 38 will rotate faster than the transmitting gear-wheel 22.

FIG. 3 being a B-B sectional view, there can be seen the bearings 29 and the ends of the driving-shafts 30 behind the second toothings 31. FIG. 3 also shows how the collecting gear-wheel 36 is connected to the second shaft 38, that is, the fixed connection of these two components applying the fixation element 46.

In FIG. 3 there can be seen that for the second stage 31 it is provided preferably applying a fixation element 48 that the transmitting gear-wheel 22 is not displaced relative to the shaft of the transmitting gear-wheel 22. The fixation element 48 may also be configured to be releasable.

Figure 4:
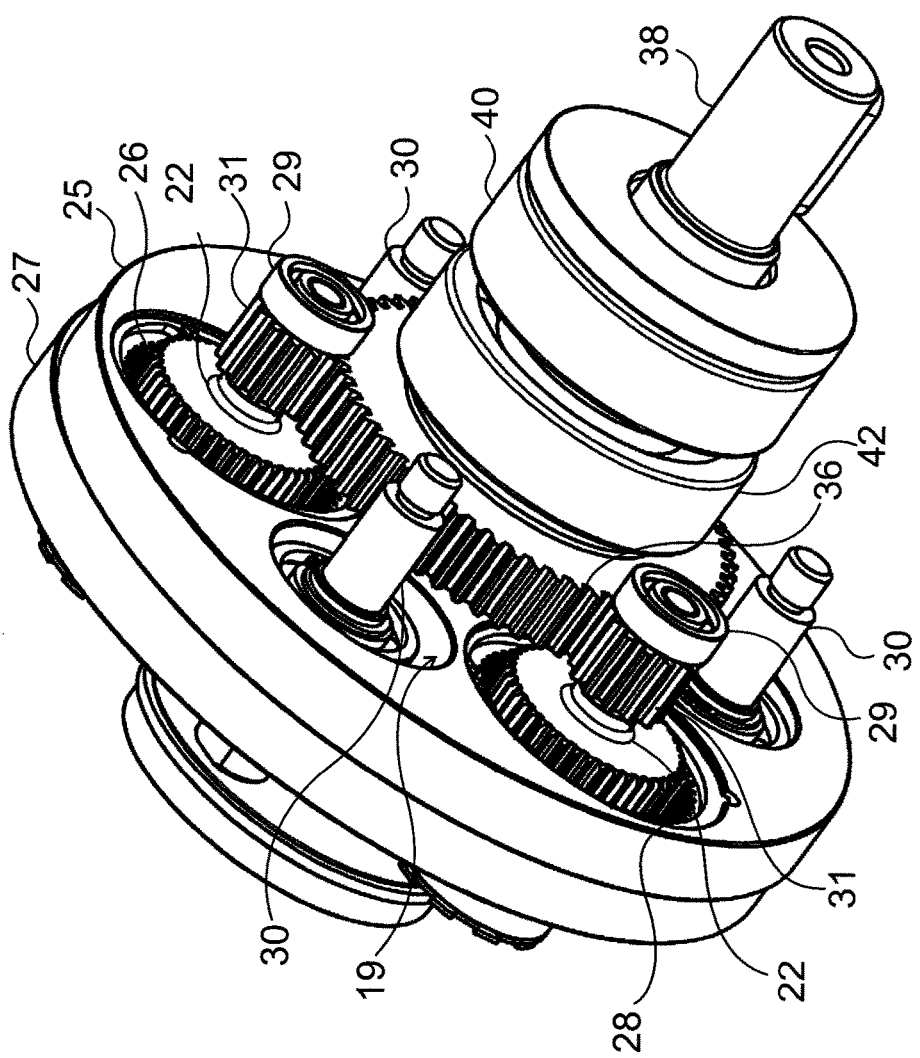
FIG. 4 is a spatial drawing illustrating the embodiment shown in FIG. 1 without the drive mechanism housing.

FIGS. 4 and 5 show the embodiment according to FIG. 1 without the drive mechanism housing 15. In FIG. 4 there is shown—from the direction of the second shaft 38—the part of the present embodiment of the drive mechanism that is located inside the drive mechanism housing 15. FIG. 4 shows the engagement of the second toothing 31 of the transmitting gear-wheels 22 to the collecting gear-wheel 36. There are also shown the bearings 40, 42 connected to the second shaft 38, and the bearings 29 mounted on the end of the transmitting gear-wheels 22. In FIG. 4 it can be seen how the transmitting gear-wheel 22 and the driving-shaft 30 are connected to the wobbling discs 25, 27.

FIG. 5 shows a view of the embodiment of the drive mechanism shown in FIG. 1 from the direction of the first shaft 10. Accordingly, this drawing is focused on illustrating the connection of the first toothing 28 of the transmitting gear-wheels 22 and the driving-shafts 30 to the wobbling disc 25. FIG. 5 also shows a bearing 12 connected to the first shaft 10. In FIG. 5 a compensation member 21 fitted to the end of the transmitting gear-wheels 22 can be observed in detail.

The embodiments illustrated in FIGS. 1 to 5 have the advantage that console mounting is not required for the first and second toothing that are mounted on the shaft of the transmitting gear-wheels, and that only relatively low-cost externally toothed gears are required to provide the engagement of the second toothing and the collecting gear-wheel.

Figure 6:
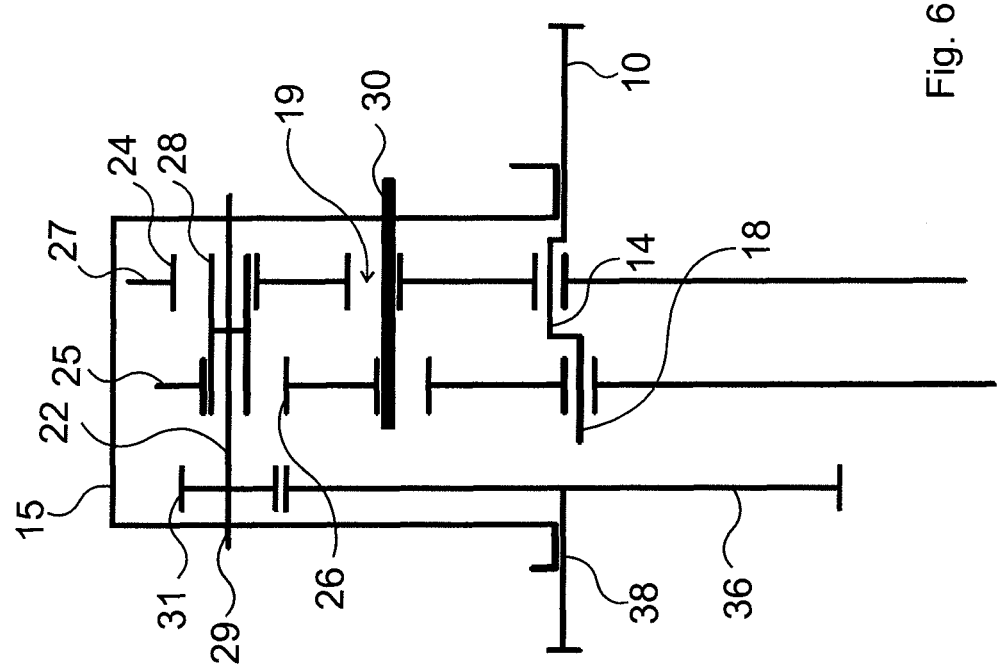
FIG. 6 is a schematic drawing illustrating the embodiment shown in FIG. 1.

FIG. 6 shows the kinematic sequence of an embodiment that is slightly different from the one illustrated in FIGS. 1 to 5. In FIG. 6 therefore only the kinematic sequence is illustrated instead of the real structure of the drive mechanism (accordingly, in this embodiment the driving-shaft 30 and the transmitting gear-wheel 22 are not necessarily arranged below each other, or even at the radii shown in the drawing). A number of other figures, to be described later on, also illustrate kinematic sequences. The embodiment shown in FIG. 6 differs from the one illustrated in FIGS. 1 to 5 only in that in the embodiment of FIG. 6 the driving-shafts 30 are not arranged to connect both sides of the drive mechanism housing 15 but are connected to the housing only at a single point.

Figure 8:
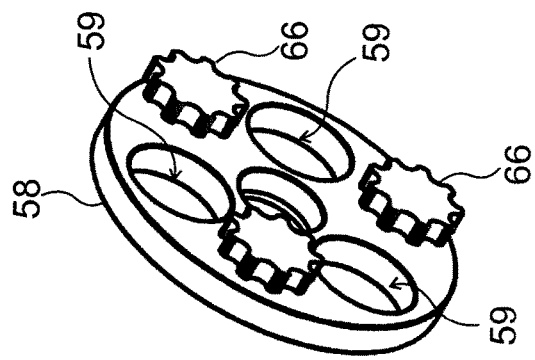
FIG. 8 is a spatial drawing illustrating the wobbling disc and the wobbling gear-wheels connected thereto of the embodiment shown in FIG. 7.
Figure 9:
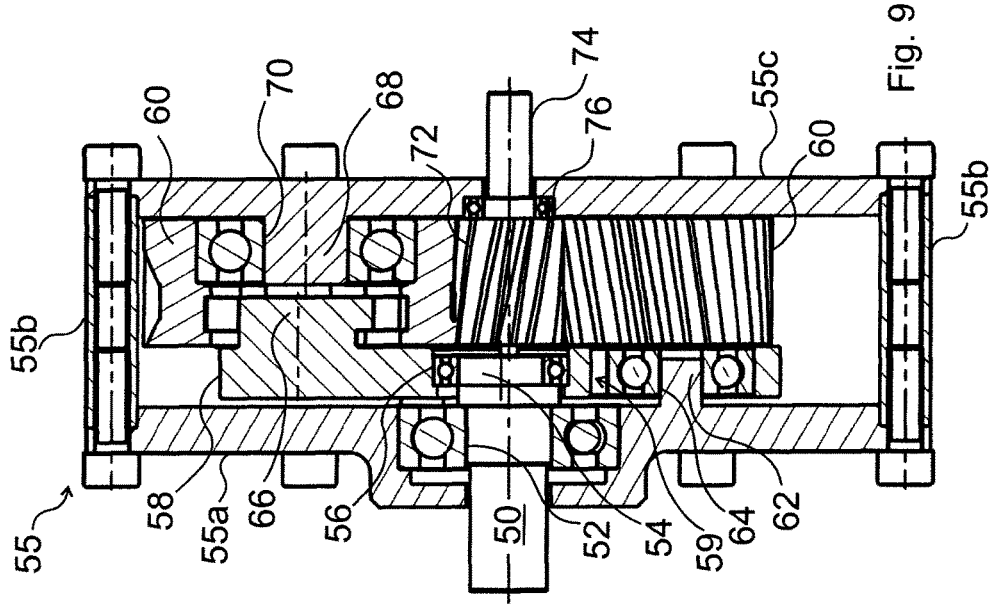
FIG. 9 is a side sectional drawing illustrating the embodiment according to FIG. 7.

A further embodiment of the invention—also having a fixed transmission ratio—is shown in FIGS. 7 to 10. As shown in FIG. 9, this embodiment of the drive mechanism according to the invention comprises a drive mechanism housing 55 and parallelly arranged first shaft 50 and second shaft 74 that are rotatably connected to the drive mechanism housing 55. In this embodiment, a single eccentric shaft section 54, is connected to the first shaft 50, the axis of the eccentric shaft section 54 being parallel with the first shaft 50. As shown in FIG. 9, the drive mechanism housing 55 comprises drive mechanism housing portions 55a, 55b and 55c. A wobbling disc 58 is rotatably connected to the eccentric shaft section 54 by means of a bearing 56, with driving-shafts 62 connected to the drive mechanism housing 55 being arranged in driving-bores 59 of the wobbling disc 58 similarly to the embodiment shown in FIGS. 1 to 5. In a manner illustrated in FIG. 8 three externally toothed wobbling gear-wheels 66 are connected to the wobbling disc 58. As shown in FIG. 9 the wobbling gear-wheel 66 is connected to the wobbling disc 58 with a constant, i.e. fixed connection since the two components are formed as a single piece. FIG. 8 also shows the driving-bores 59.

A great advantage of the present embodiment is that the engagement (connection) between the wobbling gear-wheel 66 and the first toothing of the transmitting gear-wheel 60 and the engagement between its second toothing and the collecting gear-wheel can be formed in the same plane, which allows for size reduction.

In a manner shown in FIG. 9 the first shaft 50 is rotatably connected to the drive mechanism housing 55 by bearing 52, while the second shaft 74 is rotatably connected thereto by bearing 76. A bearing 64 is arranged around the driving-shaft 62 in the driving-bore 59, with the outside portion of the bearing being supported against the wall of the driving-bore 59. The transmitting gear-wheel 60 is connected to a shaft 68 by a bearing 70 as shown in FIG. 9 such that the transmitting gear-wheel 60 can only be rotated about its own axis of rotation with respect to the drive mechanism housing 55. In FIG. 9 it is shown that the transmitting gear-wheel 60 and the collecting gear-wheel 72 have helical toothing.

Figure 7:
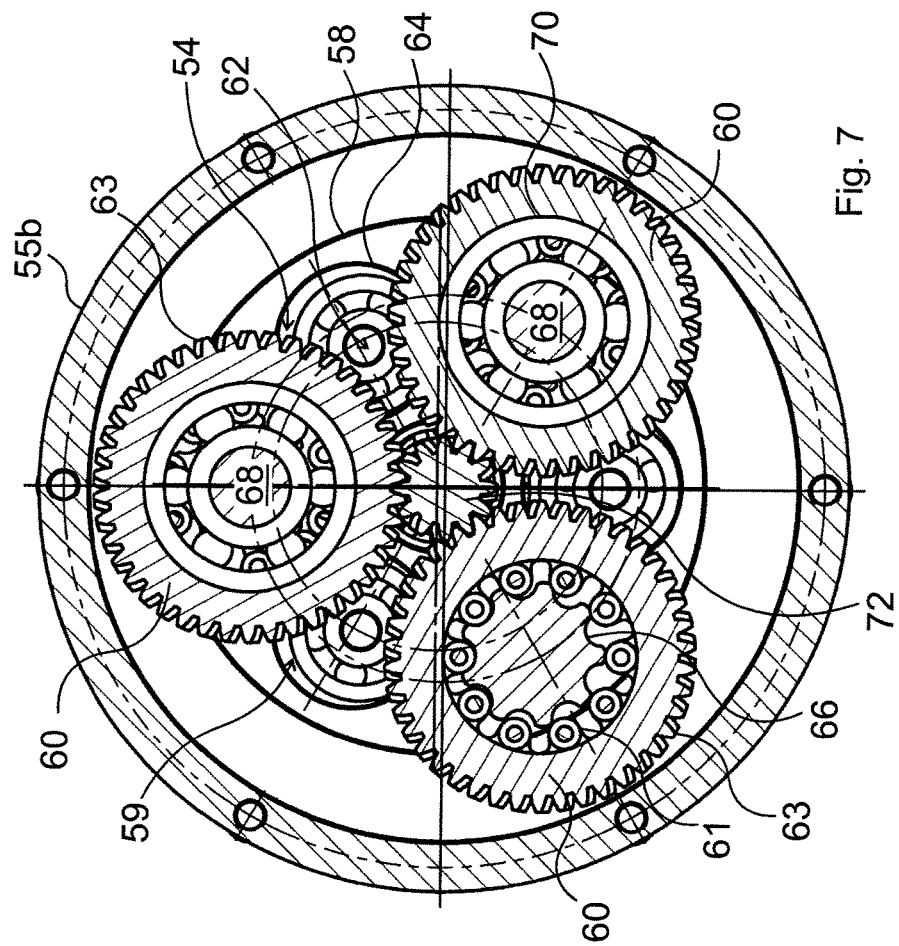
FIG. 7 is an exploded view illustrating a further embodiment of the drive mechanism according to the invention.

It is shown in FIG. 7 that the first toothing 61 is preferably formed with a toothing provided with rollers. Accordingly, the teeth of the wobbling gear-wheel 66 are of the so-called cycloidal type. FIG. 7 is not a section of FIG. 9 since the three wobbling gear-wheels 66 lie in the same plane (as it can be observed also in FIG. 8) with respect to the wobbling disc 58, while in FIG. 7 the shaft 68 and the bearing 70 arranged around it are shown (at two places) covering the wobbling gear-wheel 66.

In this embodiment, the first toothing 61 of a transmitting gear-wheel 60, formed as internal toothing, is connected to the toothing of the wobbling gear-wheel 66 such that the distance between the axis of the wobbling gear-wheel 66 and the axis of the first toothing 61 connected to (engaging) it is the same as the eccentricity of the eccentric shaft section 54, i.e. the eccentricity parameter.

As it is shown also in FIG. 7, the second toothing 63 of the transmitting gear-wheel 60 is formed as external toothing. The transmitting gear-wheels 60 are connected by their second toothing 63 to an externally toothed collecting gear-wheel 72 mounted on the second shaft 74. In the embodiment illustrated in FIGS. 7 to 10, therefore the wobbling gear-wheels 66 are externally toothed, and the first toothing 61 of the transmitting gear-wheel 60 is formed as an internal toothing.

As with the embodiment of FIG. 1, thanks to the engagement between the wobbling gear-wheels 66 and the transmitting gear-wheels 60 and to the connection to the driving-shafts 62, during the rotation of the first shaft 50 the wobbling disc 58 undergoes translatory motion along a circular path, i.e. it undergoes a so-called purely wobbling motion. Similarly to the embodiment shown in FIGS. 1 to 5, the present embodiment comprises more guiding connections (additional connections formed by wobbling gear-wheels 66 and the transmitting gear-wheels 60, as well as by driving-shafts 62) than the required minimum, besides the connection of a single wobbling gear-wheel 66 and a transmitting gear-wheel 60.

The wobbling gear-wheels 66 mounted to the wobbling discs 58 induce the rotation of the transmitting gear-wheels 60 that can be rotated with respect to the drive mechanism housing 55 only about their own axes of rotation. Due to the ratio of the number of teeth of the wobbling gear-wheels 66 and the first toothing 61 of the transmitting gear-wheels 60 a transmission ratio is produced between the first shaft 50 and the transmitting gear-wheels 60, and thereby the transmitting gear-wheels 60 rotate slower than the first shaft 50. A second toothing 63 of the transmitting gear-wheels 60, connected to the collecting gear-wheel 72, rotate the collecting gear-wheel 72 according to the transmission ratio coming from the ration of the teeth numbersh, the collecting gear-wheel 72 inducing the rotation of the second shaft 74 (which is, by way of example, a slowly rotating shaft).

Figure 10:
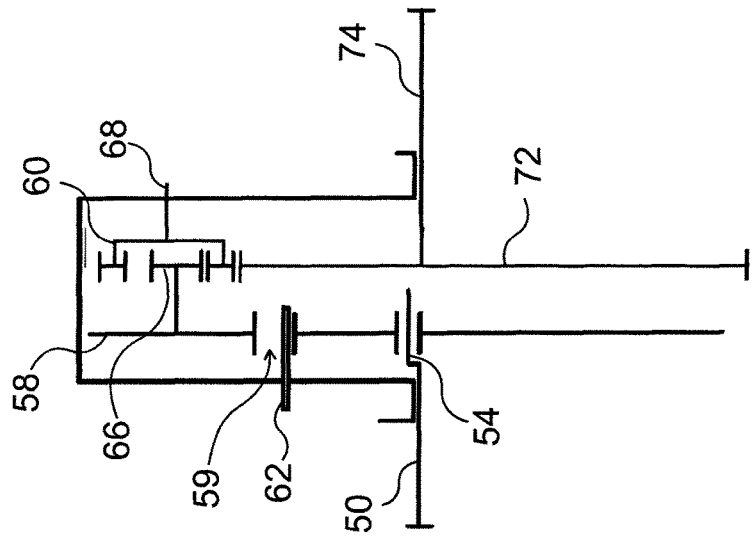
FIG. 10 is a schematic drawing illustrating the embodiment shown in FIG. 7.

FIG. 10 illustrates in a schematic drawing the kinematic sequence of the embodiment illustrated in FIGS. 7 to 9. In FIG. 10 the engagement of the wobbling gear-wheel 66 and the transmitting gear-wheel 60, as well as the engagement of the second toothing of the transmitting gear-wheel 60 to the collecting gear-wheel 72, are illustrated schematically.

Figure 11:
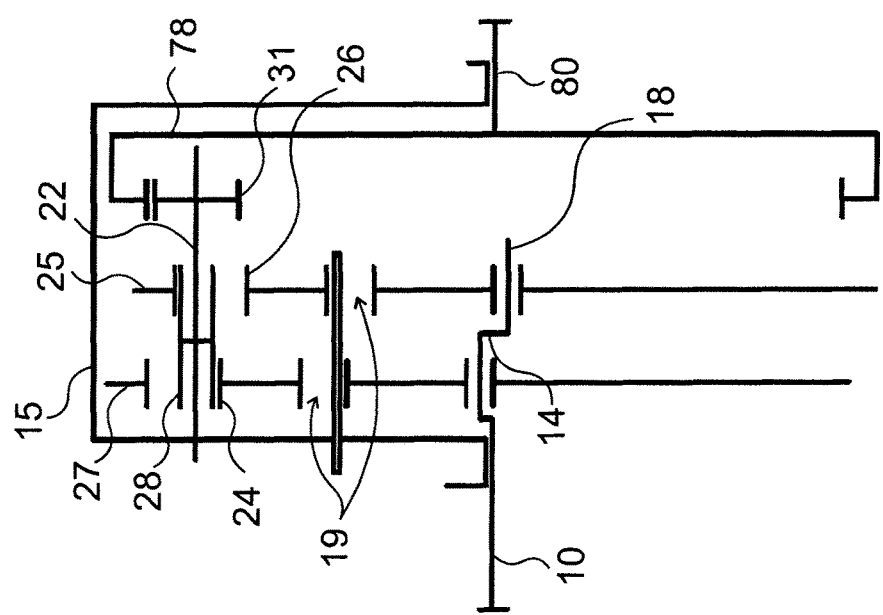
FIG. 11 is a schematic drawing illustrating a yet further embodiment of the drive mechanism according to the invention.

A further embodiment of the fixed transmission ratio variant of the invention is shown in FIG. 11. Comparing FIG. 11 with FIG. 6 it can be observed that the only difference between the embodiment of FIG. 11 and the one illustrated in FIG. 6 is that in the present embodiment the second toothing 31 of the transmitting gear-wheel 22 is connected to an internally toothed collecting gear-wheel 78, and the collecting gear-wheel 78 is connected to a second shaft 80. The advantage of this embodiment is that—compared to the embodiment illustrated in FIGS. 1 to 5—it allows for the realization of even higher transmission ratios, without requiring changing the dimensions of other components.

Figure 12:
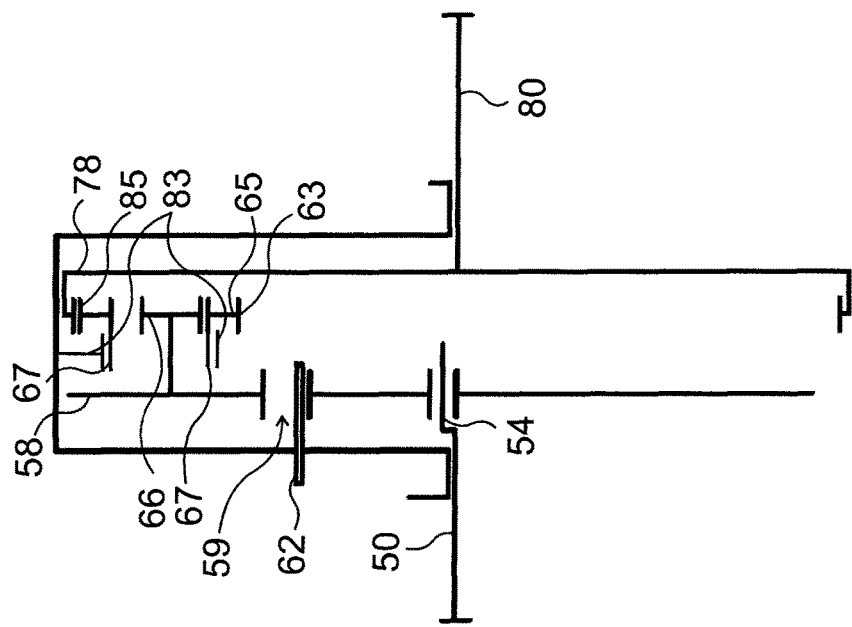
FIG. 12 is a schematic drawing illustrating an embodiment of the drive mechanism according to the invention.

A still further embodiment of the fixed transmission ratio variant of the invention is shown in FIG. 12. This embodiment is similar to the one illustrated also in FIG. 10, with the only difference being that in this embodiment a transmitting gear-wheel 65 is connected to the wobbling gear-wheel 66. Similarly to the transmitting gear-wheel 60 of the embodiment according to FIGS. 7 to 10 the transmitting gear-wheel 65 has a first toothing 61 formed as internal toothing and a second toothing 63 formed as an external toothing. However, the transmitting gear-wheels 60 and 65 are different in that a cylindrical extension element 67, connected to the drive mechanism housing 55 by a bearing 83, is connected to the transmitting gear-wheel 65 as shown in FIG. 12. A further difference between the embodiment of FIG. 12 and that of FIGS. 7 to 10 is that to the transmitting gear-wheel 65—in contrast to the transmitting gear-wheel 60—an internally toothed collecting gear-wheel 78 is connected, which is also connected to the second shaft 80. Applying this embodiment, an even higher transmission ratio can be achieved compared to the embodiment of FIGS. 7 to 10, without requiring changing the dimensions of other components.

Figure 13:
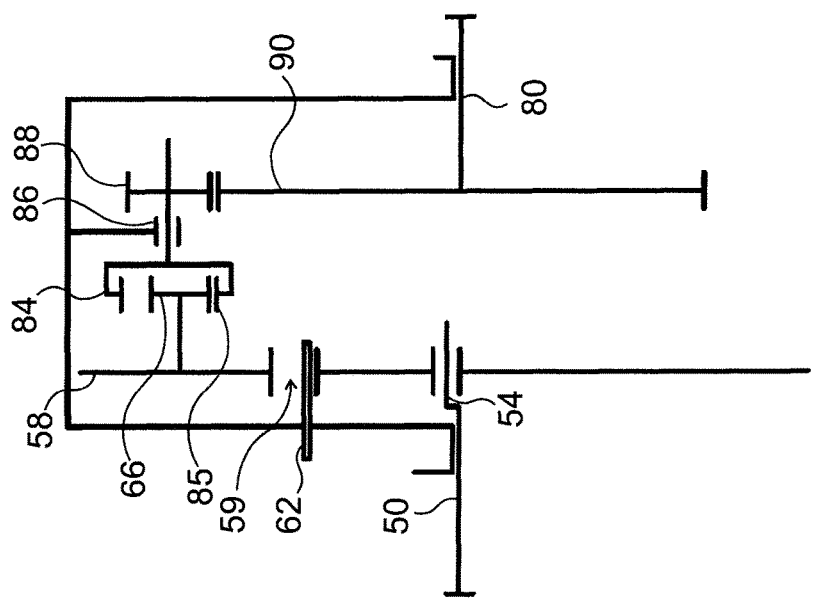
FIG. 13 is a schematic drawing illustrating a further embodiment of the drive mechanism according to the invention.

A still further embodiment of the fixed transmission ratio variant of the invention is shown in FIG. 13. This embodiment, too, is similar to the one illustrated in FIGS. 7 to 10, the differences are described as follows. In the present embodiment a first toothing 85 of a transmitting gear-wheel 84, formed as an internal toothing, is connected to the wobbling gear-wheels 66, and the externally toothed collecting gear-wheel 90, fixed to the second shaft 80, is connected to a second toothing 88. The second toothing 88 is formed as an external toothing, but—similar to the embodiment of FIG. 1 and differently from the embodiment of FIGS. 7 to 10—the transmitting gear-wheel 84 is arranged such that the first toothing 85 and the second toothing 88 are connected to the ends of the same shaft. The shaft forming an integral portion of the transmitting gear-wheel 84 is connected by a bearing 86 to the housing 55 such that the transmitting gear-wheel 84 can only be rotated about its axis—being parallel with the second shaft 80—with respect to the drive mechanism housing 55.

In the present embodiment the above described arrangement of the transmitting gear-wheel 84 allows that—in contrast to the transmitting gear-wheel 60—the second toothing 88 need not be arranged at a larger diameter than the first toothing 85. In this embodiment the second toothing 88 shown in FIG. 13 has a lower diameter than the first toothing 85. The advantage of this embodiment is that the transmission ratio of the drive mechanism can easily be modified by replacing the second toothing 88 and the collecting gear-wheel 90.

Figure 14:
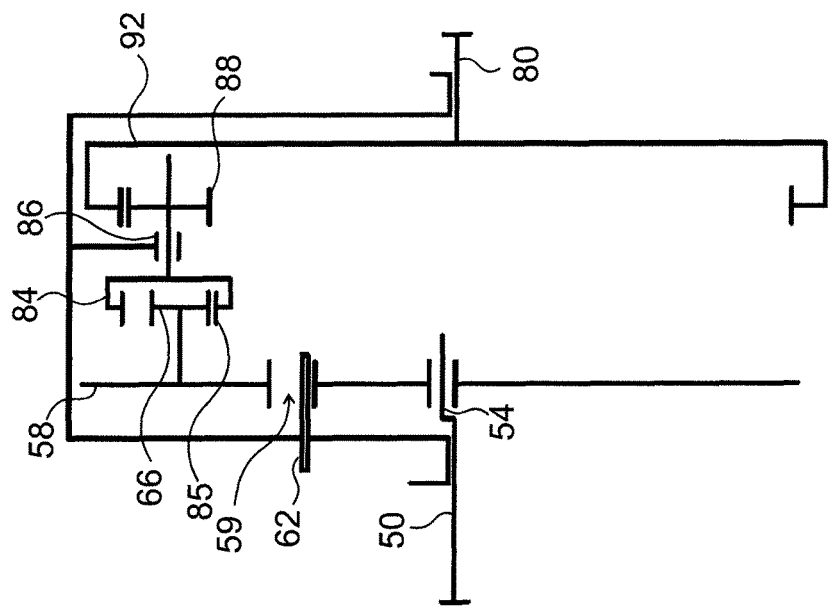
FIG. 14 is a schematic drawing illustrating a yet further embodiment of the drive mechanism according to the invention.

A further embodiment of the fixed transmission ratio variant of the invention is shown in FIG. 14. The embodiment of FIG. 14 is very similar to the one illustrated in FIG. 13, the only difference being that in this embodiment an internally toothed collecting gear-wheel 92 is connected to the second toothing 88 of the transmitting gear-wheel 84. The advantage of the embodiment of FIG. 14 is that—compared to the embodiment of FIG. 13—it allows for the realization of even higher transmission ratios, without requiring changing the dimensions of other components.

In the embodiment illustrated in FIGS. 11, 12 and 14 the second toothing of the transmitting gear-wheel is formed as external toothing, and the collecting gear-wheel has an internally toothing.

In FIGS. 15 to 18 two embodiments with selectable (variable) transmission ratio of the drive mechanism according to the invention are illustrated. In these embodiments the drive mechanism according to the invention comprises a second shaft that is rotatably connected to the drive mechanism housing and being parallel with the first shaft, a collecting gear-wheel connected to the end of the second shaft being at the drive mechanism housing, having an axis of rotation parallel with the second shaft, and the transmitting gear-wheels corresponding to the different stages comprising second toothings connected to the collecting gear-wheel, which second toothings are connected to the first toothings of the respective transmitting gear-wheels by means of a fixed or a releasable connection.

In the embodiments of the invention shown in FIGS. 15 to 18 a first-stage wobbling gear-wheel and a corresponding first-stage transmitting gear-wheel having a first toothing with a teeth number different from the teeth number of the first-stage wobbling gear-wheel, as well as a second-stage wobbling gear-wheel and a corresponding second-stage transmitting gear-wheel having a first toothing with a teeth number different from the teeth number of the second-stage wobbling gear-wheel, are arranged on the wobbling disc.

In order to implement more than one stages (transmission ratios), in the drive mechanism the first-stage wobbling gear-wheel and the second-stage wobbling gear-wheel are connected to the wobbling disc by a releasable connection (by way of example in a known manner, applying a so-called claw coupling or a forced-synchronizer mechanism), or the second toothing of the first-stage transmitting gear-wheel and the second toothing of the second-stage transmitting gear-wheel are connected by releasable connection to the first toothing of the first-stage transmitting gear-wheel and to the first toothing of the second-stage transmitting gear-wheel, respectively (by way of example, also utilising a claw coupling or a forced-synchronizer mechanism), and a released connection can be established by releasing the releasable connection, as well as a fixed connection can be established by locking the releasable connection between the wobbling disc and the second toothing of the corresponding transmitting gear-wheel. The releaseable connection may by way of example be operated by means of a clutch mechanism. Even in a single given embodiment of the invention it can be varied, that at which releasable connection which one of the above described two modes is applied for each of the wobbling gear-wheel—transmitting gear-wheel connections.

A multiple-stage drive mechanism can be realized utilising a transmitting gear-wheel similar to the transmitting gear-wheel applied in the embodiment according to FIGS. 7 to 10, having both internal and external toothing, wherein there is a releasable connection between the first toothing and the second toothing, and, in the released state of the connection, the second toothing—surrounding the first toothing like a ring—can be freely rotated around the first toothing.

In the embodiments according to FIGS. 15 to 18, furthermore, one of the connection between the first-stage wobbling gear-wheel and the second toothing of the first-stage transmitting gear-wheel and the connection between the second-stage wobbling gear-wheel and the second toothing of the second-stage transmitting gear-wheel is a released connection, as well as the other one of the two connections being a fixed connection, and the guiding connection is formed by the released connection. It is very important that the two stages cannot be engaged simultaneously. Because the two stages realize two different transmission ratios, upon engaging (connecting) them simultaneously the drive mechanism would get stuck and malfunction.

According to the above, the guiding connection is realized also in the present embodiment, even if both stages have only a single wobbling gear-wheel—transmitting gear-wheel pair. This is because during the operation of the drive mechanism only one stage will be engaged at any given time, and thereby only one of the wobbling gear-wheel—transmitting gear-wheel connections will be in operation as described above (as explained in relation to the single-stage drive mechanism, when the wobbling gear-wheel is connected to the wobbling disc, and also the second toothing to the first toothing of the transmitting gear-wheel by fixed connections), the other one of the connections will be in a released state, and thereby the wobbling gear-wheel can be freely rotated with respect to the wobbling disc, or the second toothing of the transmitting gear-wheel can be freely rotated with respect to its first toothing. This released connection is suited to function as a guiding connection, i.e. to induce wobbling motion to the wobbling disc together with the wobbling gear-wheel—transmitting gear-wheel connection.

In the embodiment according to FIGS. 15 and 16 the drive mechanism comprises first-stage wobbling gear-wheels 104 and a first-stage transmitting gear-wheels 102 connected thereto and having a second toothing 111, as well as wobbling gear-wheels 108 and a transmitting gear-wheel 106 connected thereto and having a second toothing 110.

In the embodiment according to FIGS. 15 and 16 the first-stage wobbling gear-wheel 104 and the second-stage wobbling gear-wheel 108 are arranged at the same radius and have teeth numbers different from each other. In this embodiment, due to the arrangement of the wobbling gear-wheels 104 and 108 at the same radius, second toothings having identical dimensions and the same number of teeth can be applied in the different stages, in a manner shown in FIG. 16. Thereby, the transmission ratio of the stages can be tuned by the selection of the teeth number of the wobbling gear-wheels and of the first toothing of the transmitting gear-wheels.

It is shown in FIG. 16 that in the present embodiment a collecting gear-wheel 112 is connected to the second gear-wheels 110, 111, and a second shaft 114 is connected to the collecting gear-wheel 112. Due to the manner of connection of the collecting gear-wheel 112 and the second shaft 114 shown in the figure, the shaft 114 cannot be rotated with respect to the collecting gear-wheel 112. The advantage of the present embodiment is that, although only the second toothings 110 and 111 have the same dimensions, the transmitting gear-wheels are located on the same pitch circle (circumferential circle) on the wobbling disc 100, which allows for more accurate manufacturing.

Figure 18:
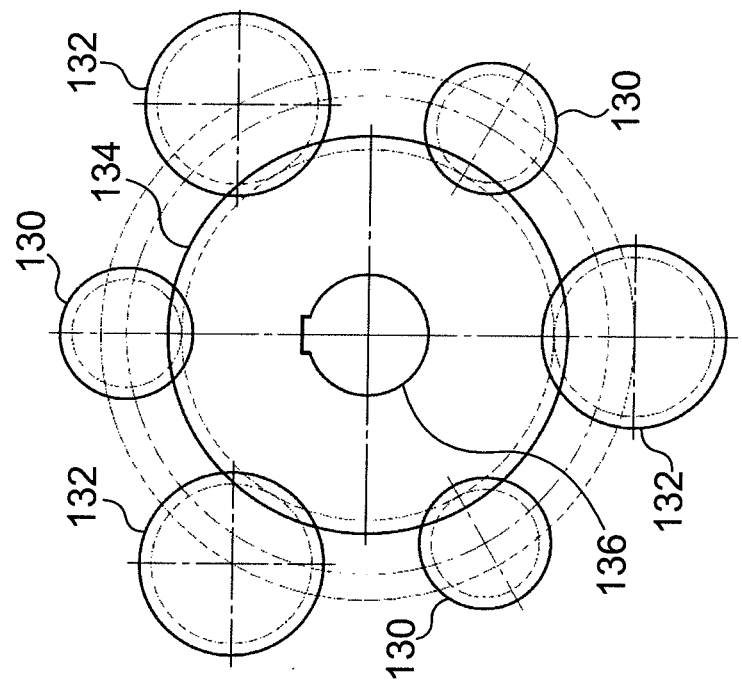
FIG. 18 is a schematic drawing illustrating a further detail of the embodiment shown in FIG. 17.
Figure 17:
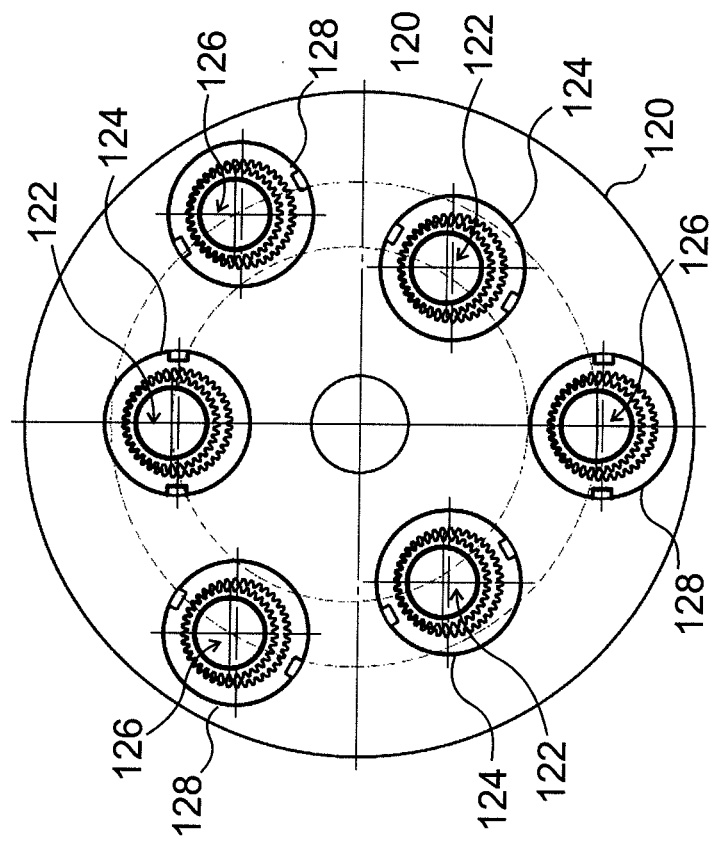
FIG. 17 is a sectional drawing illustrating a yet further embodiment of the drive mechanism according to the invention.

In the embodiment according to FIGS. 17, 18, also adapted for realizing multiple stages, a first-stage wobbling gear-wheel 124 and a corresponding first-stage transmitting gear-wheel 122 having a first toothing with a teeth number different from the teeth number of the first-stage wobbling gear-wheel 124, as well as a second-stage wobbling gear-wheel 128 and a corresponding second-stage transmitting gear-wheel 126 having a first toothing with a teeth number different from the teeth number of the second-stage wobbling gear-wheel 128, are arranged on a wobbling disc 120. The transmitting gear-wheel 122 has a second toothing 130, and the transmitting gear-wheel 126 has a second toothing 132.

In the embodiment according to FIGS. 17 and 18 the first-stage wobbling gear-wheel 124 and the second-stage wobbling gear-wheel 128 are arranged at radii different from each other. In this embodiment, due to the arrangement of the wobbling gear-wheels 124 and 128 at different radii, second toothings 130 and 132 of the transmitting gear-wheels 122 and 126 have dimensions different from each other. Expediently, different teeth number corresponds to the different dimensions. Accordingly, the wobbling gear-wheels 124 and 128 and the respective corresponding transmitting gear-wheels 122 and 126 may be formed identically; and the transmission ratio of the individual stages may preferably be tuned by the appropriate selection of the teeth number of the second toothings 130, 132 of the transmitting gear-wheels 122, 126.

It is shown in FIG. 18 that in the present embodiment a collecting gear-wheel 134 is connected to the second gear-wheels 130, 132, and a second shaft 136 is connected to the collecting gear-wheel 134.

Based on the embodiments shown in FIGS. 15 to 18, drive mechanisms with more than two stages may also be realized in a manner analogous to the embodiment shown in FIGS. 15 and 16 or to the one shown in FIGS. 17 and 18. The multiple stages can be formed (implemented) applying different wobbling gear-wheels and transmitting gear-wheels connected thereto arranged on the wobbling disc at the same radius. The multiple stages can also be implemented applying wobbling gear-wheels and transmitting gear-wheels connected thereto arranged at different radii.

Therefore, on the wobbling discs 100, 120 as many wobbling gear-wheels are preferably arranged as the desired number of stages, or the number of wobbling gear-wheels may also be a multiple of the desired number of stages. In the embodiments of FIGS. 15 to 18—similar to the embodiments with constant transmission ratio—the distance between the axis of each wobbling gear-wheels and the axis of the respective transmitting gear-wheels connected thereto is the same as the eccentricity of the eccentric shaft section, i.e. as the eccentricity parameter.

The different embodiments of the drive mechanism according to the invention can be interconnected in a series connection.

The distribution of power into N branches (N is the number of wobbling gear-wheels) that occurs with the wobbling discs (undergoing purely wobbling motion) driven by the eccentric input driving shaft allows for smaller radial dimensions with very good efficiency.

FIG. 19 illustrates a further embodiment of the drive mechanism according to the invention. In this embodiment the first shaft (which is e.g. an input driving shaft but can also perform the function of an output driving shaft) is configured differently compared to the above described embodiments. As it is shown in FIG. 19, a first shaft 310 is rotatably connected to a drive mechanism housing 315 by means of a bearing 307. As it is explained in detail in relation to FIG. 21, the first shaft 310 has a tubular configuration.

An important feature of the first shaft is that it can be rotated inside the drive mechanism housing, and thereby—with the help of the one or more (in the present embodiment, two) eccentric shaft sections formed inside it—it can induce the wobbling motion of the wobbling discs surrounded by the eccentric shaft sections. In this embodiment, therefore, the eccentric shaft sections 314, 316 are formed within the first shaft as tubular shaft sections rotatably connected to the periphery of the wobbling discs 325, 327 (that is, they are connected from the outside to the wobbling discs). The tubular shaft section is therefore a shaft portion which surrounds tube-like the disc to be rotated.

Thanks to the forming of the eccentric shaft sections as tubular shaft sections, the wobbling discs can be forced (induced) to wobbling motion by means of a transmitting gear-wheel and at least one further guiding connection. Therefore, when the first shaft 310 rotates in the drive mechanism housing 315, the wobbling discs 325, 327 undergo wobbling motion. By a given eccentric shaft section being parallel with the first shaft in the context of this embodiment it is meant that the axis of rotation of the first shaft is parallel with the axis of symmetry of the eccentric shaft section formed as a tubular shaft section. As it is illustrated in FIG. 19, the axis of symmetry of the eccentric shaft section is offset with respect to the axis of rotation of the first shaft 310 by the eccentricity parameter value. Similarly to the embodiments described above, in the present embodiment the corresponding wobbling disc 325, 327 is rotatably connected to each eccentric shaft section 314, 316 (due to the inclusion of bearings 303 and 305).

In a different manner from what is illustrated in FIG. 19, the first shaft may also have an elongated configuration, and may even extend sideways from the drive mechanism housing. Similarly to the above described embodiments, in case a first shaft having such a configuration the eccentric shaft section would also be arranged at the end thereof being at the drive mechanism housing. In this embodiment is it sufficient to apply a first shaft illustrated in the drawing, i.e. a configuration laterally extending from the drive mechanism housing is not necessary. Due to the specially formed shafts in this embodiment the connection between the first shaft and the eccentric shaft sections means that these are preferably formed as a single piece. However, such a configuration can also be contemplated wherein the first shaft and the one or more eccentric shaft sections are implemented as separate interconnected components.

The shaft construction of the embodiments illustrated in FIGS. 1 to 18, comprising a first shaft and eccentric shaft sections arranged one after the other is equivalent with the shaft construction applied in the embodiments illustrated in FIG. 19 and in the subsequent drawings since they perform a substantially identical function, (they provide an input driving allowing for the wobbling motion of the wobbling discs, or—in case they function as an output driving shaft—they provide an output driving originating from the wobbling motion), and this function is performed in substantially the same manner (both arrangements comprise shaft sections being offset by the eccentricity parameter value in order to perform the desired functionality, but in one of the constructions it is realized by means of a rod-like shaft, while in the other, by means of a tubular shaft) and with substantially the same result (the result of applying both shaft constructions is the establishment of an eccentric connection between the first shaft functioning as an input/output driving shaft and the wobbling discs).

In the present embodiment the drive mechanism comprises wobbling gear-wheels 324, 326 which have their respective axes of rotation offset with respect to the axis of rotation of the eccentric shaft section. In a manner similar to the above described embodiments, a transmitting gear-wheel 322 is connected to the wobbling gear-wheels 324, 326. Similarly to the above detailed approaches, a further guiding connection is provided in the present embodiment by a driving-bore and a driving-shaft 330 extending therein.

Furthermore, in this embodiment there is arranged a collecting gear-wheel 336, and at least one transmitting gear-wheel 322 comprises a second toothing connected to the collecting gear-wheel 336, the second toothing being adapted for transferring the rotation of preferably multiple transmitting gear-wheels to the second shaft 338 (arranged by way of example as an output driving shaft) connected to the collecting gear-wheel 336.

Also, as it is shown in FIG. 19, a rotatory member 317 adapted for facilitating the rotating moting/rotation of the first shaft 310 is arranged around the first shaft 310. In case the first shaft 310 is to be rotated by means of an electromagnetic field in an electric motor, then the rotatory member 317 will function as the stator part of the electric motor, while the first shaft 310 will perform the function of the rotor part of the motor. Such an arrangement is illustrated in FIG. 20. In the present embodiment, therefore, a rotatory member 317, adapted to be applied as the stator part of an electric motor, is arranged along the periphery of the first shaft 310.

In the context of the present application the axis of a component means, in the case of the eccentric shaft section, the wobbling gear-wheel and in similar cases, the axis of symmetry of the given component; however, the first shaft is formed—as shown in the drawings—as a rod-like or tubular input or output driving shaft.

In FIG. 20 the drive mechanism according to the invention is integrated in an electrically driven motor. In a manner shown in the drawing, the first shaft 310 is connected to (embedded in) the rotatory member 317 integrated in the motor, with the wobbling disc 327 being connected by a bearing support 305 to the eccentric shaft section 316 arranged inside the first shaft 310. FIG. 20 shows a collecting gear-wheel 336 schematically illustrated in FIG. 19, and a second shaft 338 connected thereto. It is shown in FIG. 20, that the second toothing of the transmitting gear-wheel 322 protrudes from between the wobbling gear-wheels 326. In this embodiment the entire transmitting gear-wheel is implemented applying a single continuous toothing (there is no separate first toothing adapted to be connected to the wobbling gear-wheels and second toothing adapted to be connected to the collecting gear-wheel), i.e. the toothing connected to the wobbling gear-wheels 326 is of the same configuration as (and is adjacently joined to) the second toothing of the transmitting gear-wheel 322 that is connected to the external toothing of the collecting gear-wheel 336.

On the left side of FIG. 20 there is shown a service box of the electric motor; while a tab shown on the right of the drawing allows for securing the assembly to the surrounding equipment. In FIG. 20 the second toothing of the transmitting gear-wheel 322 and the external toothing of the collecting gear-wheel 336 are shown to be "overlapping". Of course, this is only a conventional way of showing the components, in reality the toothings fit to each other (engage one another). Engaged (connected) gear-wheels are conventionally depicted in this manner.

Figure 21:
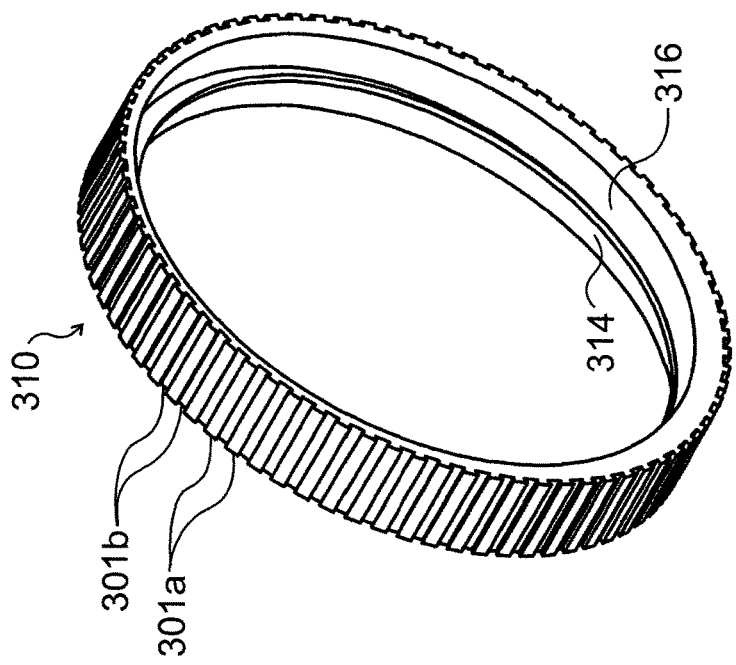
FIG. 21 illustrates in a spatial drawing the first shaft applied in the embodiment according to FIG. 19.

In FIG. 21 the first shaft 310 is shown. The arrangement of the eccentric shaft sections 314 and 316 inside the first shaft 310 can be observed in this figure. The eccentric shaft sections 314 and 316, being arranged inside the first shaft 310, are shifted (offset) in opposite directions by the eccentricity parameter value. This is shown in the figure by depicting the portions of the first shaft 310 surrounding the eccentric shaft section 316 at some portion thicker, at another portion thinner. The relative shifting of the two eccentric shaft sections 314, 316 can also be observed inside the first shaft 310.

Figure 23:
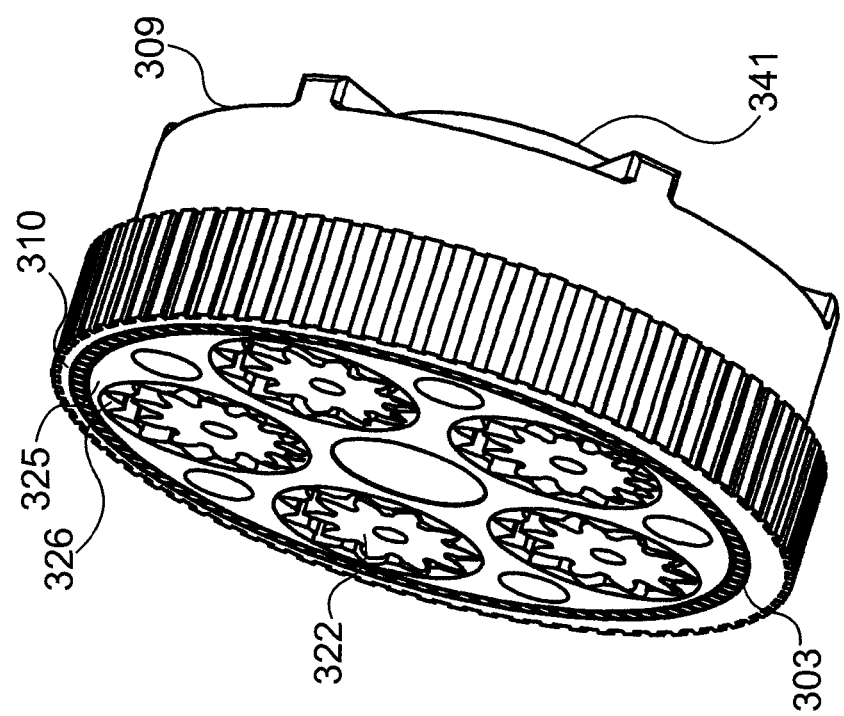

In this embodiment, therefore, the first shaft 310 has an annular configuration, which is advantageous also because—as shown in FIG. 23—the transmitting gear-wheel 322 is connected for example to two different side walls of the drive mechanism housing 315. If the first shaft 310 (having a generally cylindrical shape) was closed (covered) even at one of its sides, this two-sided connection could only be established in a cumbersome manner.

It is shown in FIG. 21, that protrusions 301a are machined in the outside circumference of the first shaft 310. These protrusions are preferably arranged such that recesses 301b, slightly widening towards the rotational axis of the first shaft 310, are formed between them. In the present embodiment the recesses 301b have a shape widening towards the rotational axis of the first shaft 310, by way of example they have a trapezoid shape widening towards the rotational axis of the first shaft 310.

It is allowed by such a configuration that magnets can be stably retained inside the recesses 301b, the magnets being unable to get disengaged from the recesses due to the shape-fit connection when the first shaft 310 is rotated. In this embodiment, therefore, recesses 301b adapted for receiving magnetizable elements are formed on the external periphery of the first shaft 310. Besides that, these magnets can also be secured to the first shaft 310 by adhesive bonding such that they cannot be displaced in the direction of the rotational axis of the first shaft 310. Thereby the magnets required for the first shaft 310 to function as the rotor part of an electrically driven motor can be arranged on the first shaft 310. It is not necessarily required to form appropriately shaped recesses in the material of the shaft as the magnetizable elements can be secured to the otherwise smooth outside surface of a shaft, or alternatively the first shaft can be pressed in the rotor part of an electric motor (in this case a so-called torque connection is formed).

Rotation of the first shaft 310 is brought about not necessarily by means of an electromagnetic field, the first shaft 310 can also be rotated applying a fluid (liquid or gas) flow, preferably by arranging blades on the circumference of the first shaft 310. This embodiment has the great advantage that, since the first shaft 310 encompasses all the other components of the drive mechanism, the circumferential speed of the first shaft 310 can be higher compared to the embodiments presented above, and that the force arm of the first shaft 310 is also greater. Thereby, such drive mechanisms can be provided that have more favourable characteristics from the aspects of energy consumption and economy and have lower torque demand, even when realizing the same transmission ratio as the above described embodiments. In the above presented embodiments the eccentric shaft sections are connected to the wobbling discs such that a bearing is arranged on the circumference of the shaft sections, with the outside surface of the bearing being connected to the wobbling discs. In the present embodiment the lubrication characteristics can be made more favourable from the aspect of hydrodynamics due to the differences of the bearing configurations.

Figure 22:
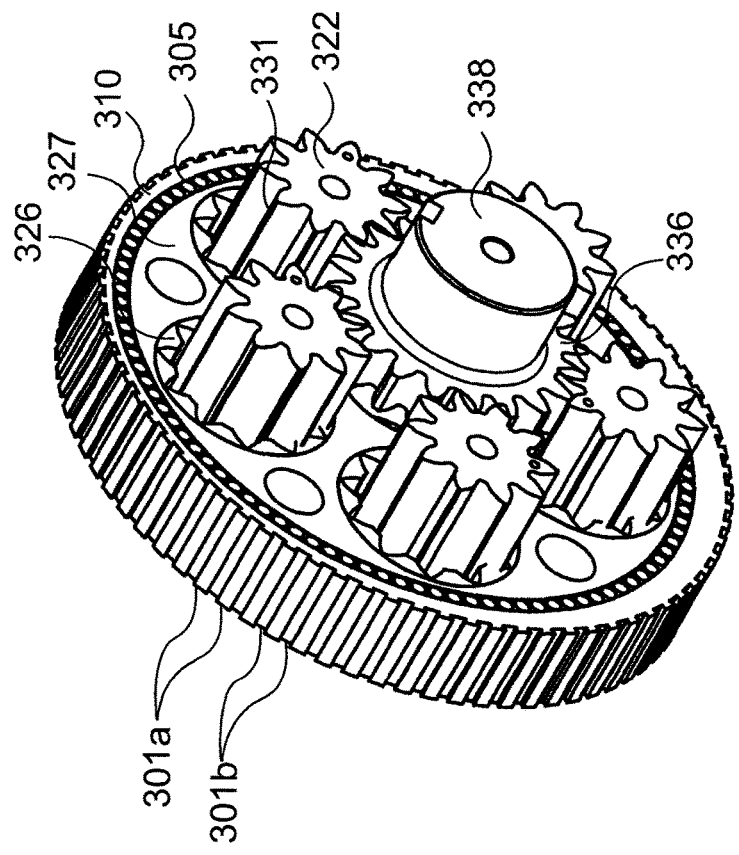
FIG. 22 illustrates in a spatial drawing the major structural components of the embodiment according to FIG. 19, FIGS. 23 and 24 illustrate in spatial drawings a still further embodiment of the invention.

FIG. 22 illustrates the first shaft 310 of the present embodiment and the components arranged inside it. The bearing 305 arranged between the eccentric shaft sections arranged inside the first shaft 310 and the circumference of the wobbling disc 327, as well as the transmitting gear-wheels 322 protruding from the wobbling gear-wheels 326, can be easily seen in FIG. 22.

Figure 24:
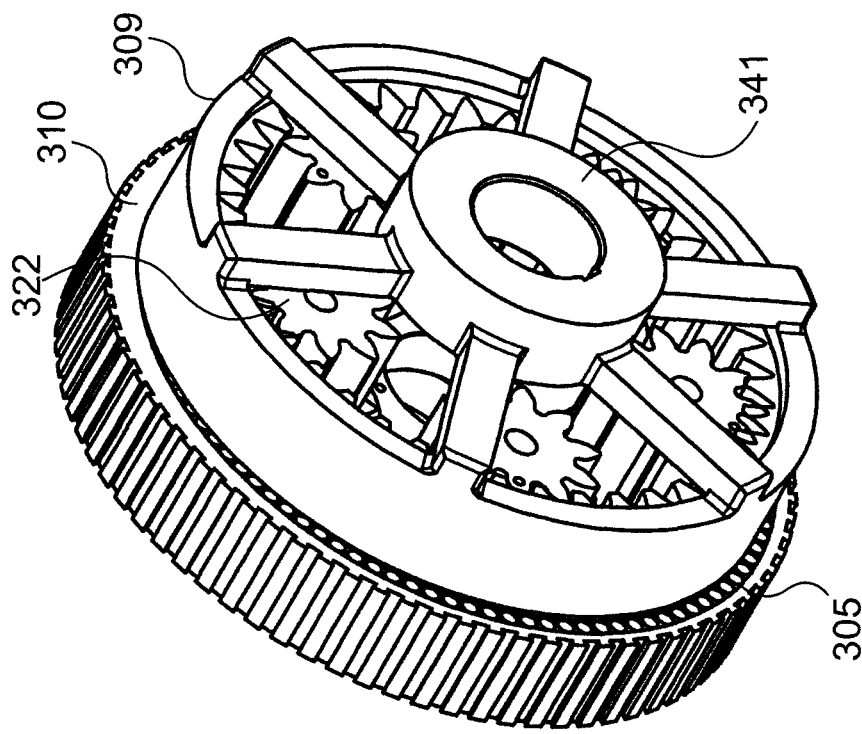

In FIGS. 23 and 24 an embodiment similar to the one illustrated in FIGS. 19 to 22 is shown; this embodiment is explained in comparison with FIG. 22, because the present embodiment does not comprise the collecting gear-wheel 336 and the second shaft 338. In this embodiment, an internally toothed collecting gear-wheel 309, connected from the outside to the transmitting gear-wheels 322, is comprised instead of these components. According to FIG. 24, a connecting element 341 is connected to the collecting gear-wheel 309, with spokes of the connecting element 341 being connected to the circumference of the collecting gear-wheel 309, and the ring-like centre portion thereof being supported by the other end of the spokes. This configuration of the connecting element 341 is advantageous because a shaft can be incorporated in the interior thereof. The slot adapted for securing the shaft is also shown in FIG. 24.

In this embodiment, therefore, in conjunction with the application of an internally toothed collecting gear-wheel an output driving shaft can be connected to the drive mechanism, but the rotating motion can also be transferred from the collecting gear-wheel 309 by other means. In the latter case the present embodiment has the great advantage that no component is arranged in the region of the centre axis of drive mechanism, and therefore this region can be utilised, for example, for passing cables therethrough. In this embodiment, therefore, the collecting gear-wheel has an internal toothing, and a connecting member, having a passage opening arranged around the axis of rotation of the first shaft, being adapted to allow the connection of the second shaft, is connected to the collecting gear-wheel.

Figure 25:
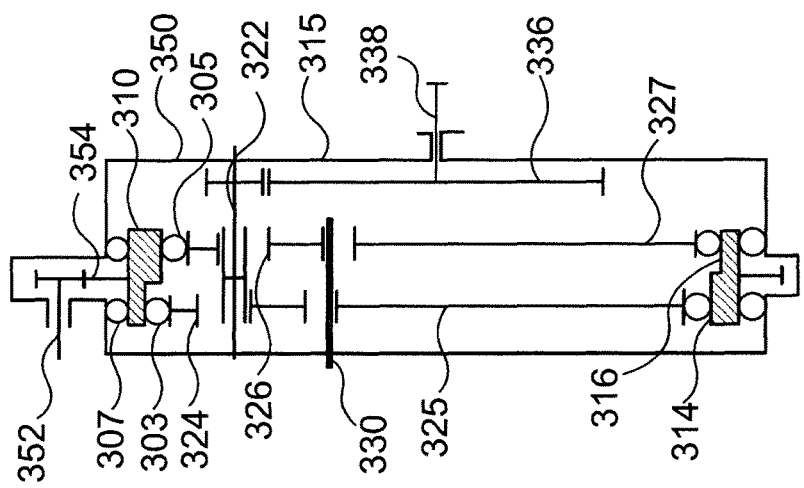
FIG. 25 illustrates a further embodiment similar to the one shown FIG. 19.

A further embodiment of the drive mechanism according to the invention is shown in FIG. 25. This embodiment differs from the one illustrated in FIG. 19 in that an externally toothed gear-wheel 354 is connected to the first shaft 310, by means of which the first shaft 310 can be rotated with the help of an externally toothed gear-wheel 352. The advantage of this embodiment is that by such a configuration the transmission ratio of the drive mechanism can be increased significantly, while the axial dimensions of the drive remain the same.

Figure 26:
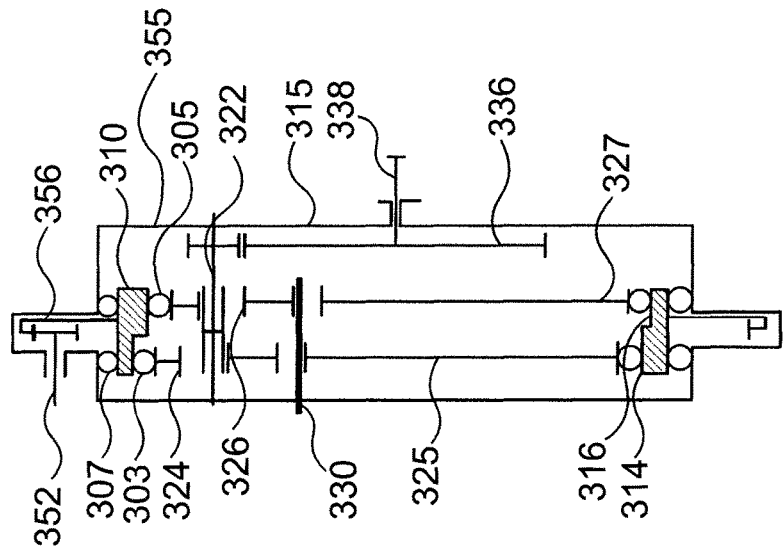
FIG. 26 is a schematic drawing illustrating a further embodiment of the invention.

A similar embodiment is shown in FIG. 26 as well. In this embodiment the gear-wheel 352 drives the first shaft 310 through an internally toothed gear-wheel 356. The gear-wheel 356 is connected to the circumference of the first shaft 310. Similarly to the embodiment of FIG. 25, the present embodiment has the advantage that the transmission ratio of the drive mechanism can be significantly increased, and a higher efficiency can be attained compared to the drive according to FIG. 25, while the axial dimensions remain the same and the radial dimensions are only slightly larger.

Figure 28:
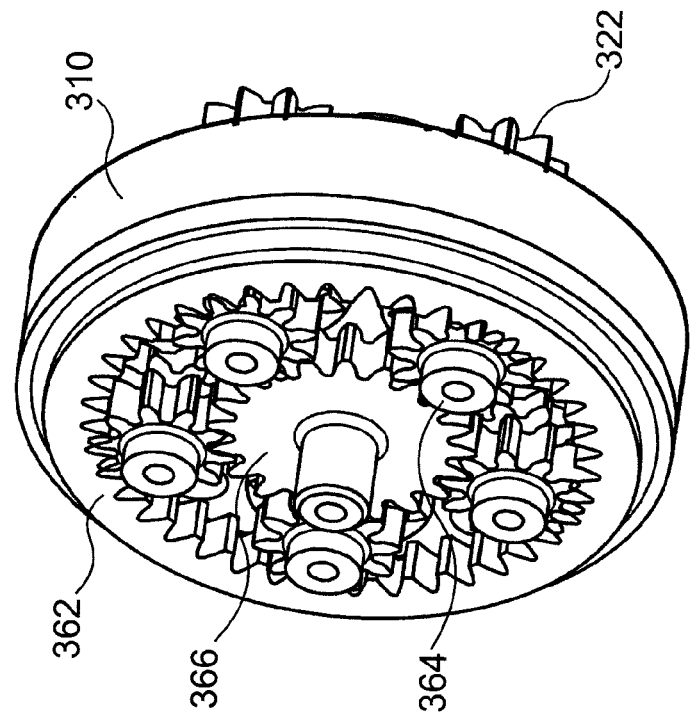
Figure 27:
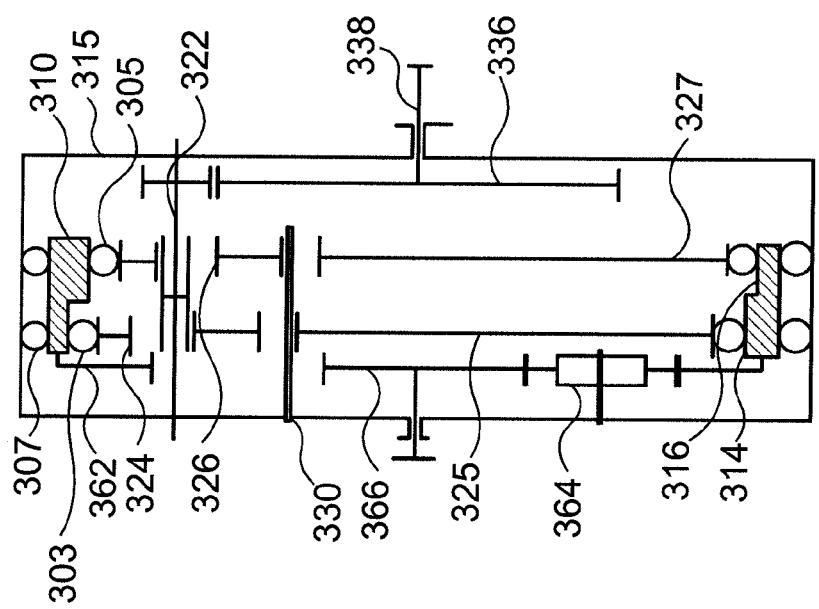
FIG. 27 is a schematic drawing illustrating an embodiment similar to the previous ones (shown in FIGS. 25 and 26), FIG. 28 a spatial drawing illustrating the major structural components of the embodiment according to FIG. 27.

A still further embodiment is illustrated in FIGS. 27 and 28. This embodiment is similar to the ones illustrated in FIGS. 19 to 26, however, in the present embodiment the first shaft 310 is driven in a different way, namely, through an internally toothed collecting gear-wheel 362. In this embodiment a gear-wheel 366 (so-called sun gear-wheel) is arranged in a manner illustrated in FIGS. 27 and 28, with epicycloidal wheels 364 (in the illustrated embodiment, five epicycloidal wheels) being connected to the circumference of the gear-wheel 366. The external toothing of the epicycloidal wheels engage the external toothing of the gear-wheel 366.

As shown in FIG. 27, the epicycloidal wheels 364 are rotatably connected to the drive mechanism housing 315, in a manner similar to the transmitting gear-wheel 322 and the driving-shaft 330. For of example, this arrangement can be implemented (as shown also in FIG. 28) such that the individual epicycloidal wheels 364 and the corresponding transmitting gear-wheels 322 are mounted on common shafts and are thereby connected to the drive mechanism housing 315. This can be realized, for example, by providing that the transmitting gear-wheel 322 driven by the wobbling discs 325 and 327 can be rotated relative to the drive mechanism housing 315, and that the epicycloidal wheel 364 (in this embodiment, more than one epicycloidal wheels corresponding to the number of transmitting gear-wheels) is rotatably arranged on the extension of the shaft of the transmitting gear-wheel 322. As the epicycloidal wheels 364 do not undergo planetary motion with respect to the drive mechanism housing 315, i.e. they can only be rotated relative to it, the driving-shaft 330 can be leaded out in the region between the epicycloidal wheels 364 towards the wall of the drive mechanism housing 315.

In FIG. 28 the connection of the internally toothed collecting gear-wheel 362 and the first shaft 310 is shown. The great advantage of this embodiment is that by including the (sun) gear-wheel 366 and the epicycloidal wheels 364 the transmission ratio of the drive mechanism can be significantly increased, while the overall radial dimensions of this embodiment are smaller than the radial dimensions of the embodiments of FIGS. 25 and 26.

In this embodiment, therefore, an externally toothed additional gear-wheel 366, having an axis coinciding with the axis of rotation of the first shaft 310, is connected to the drive mechanism housing 315, an internally toothed collecting gear-wheel 362 having an axis of rotation coincident with the rotational axis of the first shaft 310 is connected to the first shaft 310, wherein the collecting gear-wheel 362 surrounds the additional gear-wheel 366, and one or more (as shown in the drawings, in the present embodiment, five) epicycloidal wheels 364 are arranged between the additional gear-wheel 366 and the collecting gear-wheel 362, have an axis of rotation being parallel with the rotational axis of the additional gear-wheel 366 and the collecting gear-wheel 362 is rotatably connected to the drive mechanism housing 315, and connected with its toothing to the additional gear-wheel 366 and the collecting gear-wheel 362. The present embodiment a driving-shaft 330 occurs; and, in a manner similar to the embodiment of FIG. 29, it can be obviously combined with a number of the above described embodiments.

Figure 29:
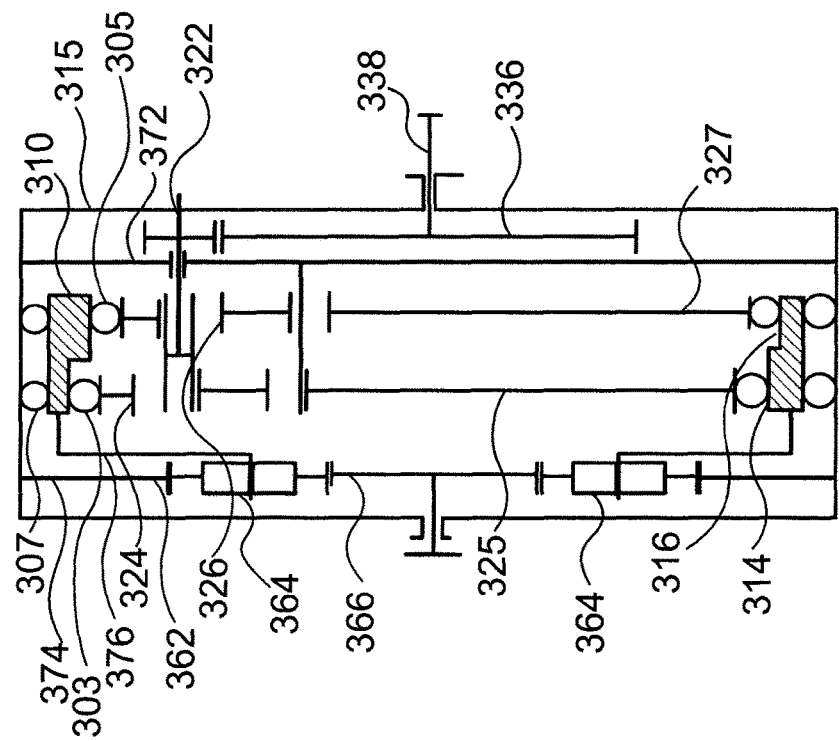
FIG. 29 is a schematic drawing illustrating an embodiment similar to the embodiment of FIG. 27.

In FIG. 29 an embodiment similar to the embodiments illustrated in FIGS. 27 and 28 is shown. Furthermore, in the present embodiment such epicycloidal wheels 364 are connected to the gear-wheel 366 that are not connected rotatably to the drive mechanism housing 315 but roll down on an internally toothed auxiliary gear-wheel 374 shown in FIG. 29. In the present embodiments, epicyclic arms 376 (joints), adapted for rotating the first shaft 310, are connected to the epicycloidal wheels 364. According to the above, therefore, the first shaft 310 can be rotated with a speed corresponding to the speed of rolling down of the epicycloidal wheels 364.

As it is also shown in the figure, the internally toothed auxiliary gear-wheel 374 is fixedly (i.e. not rotatably) connected to the drive mechanism housing 315 so that the epicycloidal wheels 364 can roll down on it. By the arrangement shown in the drawing the transmitting gear-wheel 322 is prevented from being rotatably connected to the side of the drive mechanism housing 315 being on the left of the figure, and this motion is blocked also in case of the driving-shaft 330. An auxiliary member 372, to which the transmitting gear-wheel 322 and the driving-shaft 330 are rotatably connected in a manner shown in the figure, is also arranged in the present embodiment. A collecting gear-wheel 336, connected to the second toothing of the transmitting gear-wheel 322 in the arrangement shown in the figure, is arranged between the auxiliary member 372 and the right-side wall of the drive mechanism housing 315 The advantage of the present embodiment is that the transmission ratio of the drive mechanism can be further increased compared to the previous embodiment.

In this embodiment, therefore, an externally toothed additional gear-wheel 366, having an axis coinciding with the axis of rotation of the first shaft 310, is connected to the drive mechanism housing 315, an internally toothed auxiliary gear-wheel 374, having an axis of rotation coinciding with the rotational axis of the first shaft 310, is fixed to the drive mechanism housing 315 such that the auxiliary gear-wheel 374 surrounds the additional gear-wheel 366, one or more epicycloidal wheels 364 are arranged between the additional gear-wheel 366 and the auxiliary gear-wheel 374, the axis of rotation of the epicycloidal wheels 364 is parallel with the rotational axis of the additional gear-wheel 366 and the auxiliary gear-wheel 374, the toothing of the one or more epicycloidal wheels 364 are connected to the additional gear-wheel 366 and the auxiliary gear-wheel 362, and the one or more epicycloidal wheels 364 are connected to the first shaft 310 by means of one or more epicyclic arms 376, i.e. the epicyclic arms 376 are adapted for rotating the first shaft 310 during the down-rolling motion of the epicycloidal wheels 364.

Figure 30:
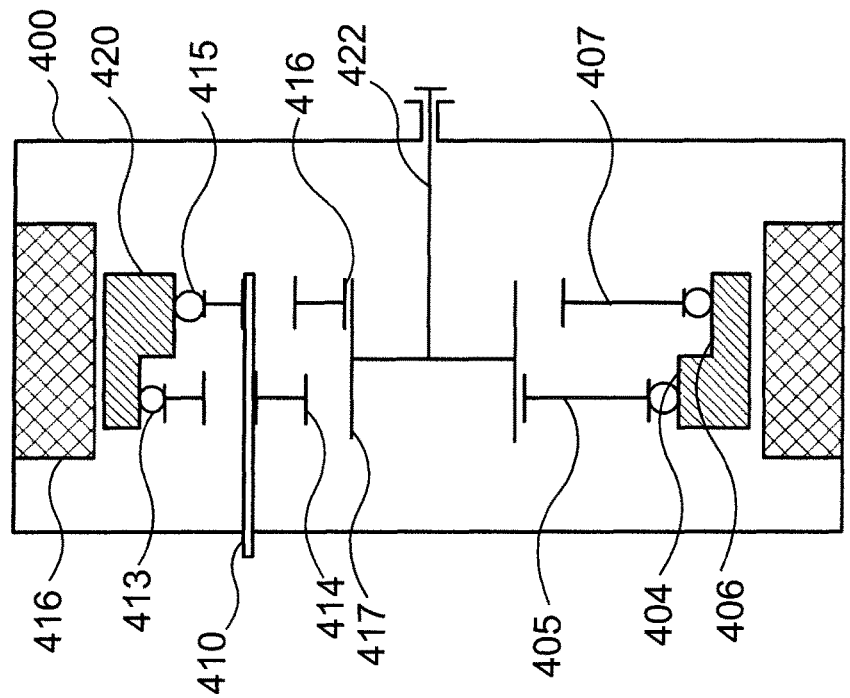
FIG. 30 is a schematic drawing illustrating a yet further embodiment of the invention.

FIG. 30 illustrates an embodiment of the drive mechanism which is an alternative compared to the embodiments described above. In this embodiment a transmitting gear-wheel 422 is arranged in the centre of the construction (therefore, centrally arranged input/output driving shafts like the first shaft 10 cannot be utilized with it), in contrast to the embodiments presented above, wherein the transmitting gear-wheels were arranged in off-central positions. This implies that the respective axes of the wobbling gear-wheels 414, 416 corresponding to the transmitting gear-wheel 422 coincide with the axes of the corresponding eccentric shaft sections 404, 406.

By the coincidence of the axes it is meant that the axes are located at the same place, i.e. in this case the rotational axes of the two internally toothed encompassing-type components are located at the same place, and accordingly these axes are parallel and there is zero distance between them.

With the help of the alternative arrangement, the present embodiment performs the functionality of the drive mechanism in a substantially similar manner to the above described embodiments, i.e. by the application of eccentric shaft sections, a transmitting gear-wheel, and a guiding connection the wobbling disc is induced to wobbling motion, the transmitting gear-wheels are rotated according to this motion (in case rotation is output-driven from the transmitting gear-wheel; if, however the transmitting gear-wheel is applied as an input driving, then the wobbling motion acts on the eccentric shaft sections).

The present alternative embodiment may of course be applied together with several components presented in relation to the above described embodiments, i.e. except for the configuration and arrangement of the eccentric shaft sections and the transmitting gear-wheels the present drive mechanism is in configuration to the above described drive mechanisms. In case no incompatibility occurs, these components can also be utilized in the embodiments to be presented below.

In this embodiment, therefore, the first shaft cannot be arranged in the centre of the wobbling disc, and thus in the present embodiment a first shaft similar to the first shaft 310 illustrated in FIGS. 19 to 29 must be applied. Applying a first shaft configured that way the wobbling discs can be induced to wobbling motion in such a way that the transmitting gear-wheel may be arranged at virtually any position of the wobbling discs, that is, even in the centre thereof.

In this embodiment the drive mechanism adapted for the transmission of rotating motion comprises a drive mechanism housing 400 and a first shaft 420 rotatably connected to the drive mechanism housing 400, eccentric shaft sections 404 and 406 being parallel with the first shaft 420 and being offset with respect to first shaft 420 by an eccentricity parameter value, wobbling discs 405 and 407 being rotatably connected to the eccentric shaft sections 404, 406, as well as a pair of wobbling gear-wheels 414, 416 connected by means of fixed or releasable connections to the wobbling discs 405 and 407 and having axes parallel with the first shaft 420.

Similarly to the above described embodiments, this embodiment may also comprise only a single wobbling disc, with which the present embodiment is perfectly capable of normal operation. In this embodiment, furthermore, the eccentric shaft sections 404, 406 are formed within the first shaft 310 as tubular shaft sections rotatably connected to the periphery of the wobbling discs 405, 407, and the rotational axes of the wobbling gear-wheels 414, 416 coincides with the axes of the eccentric shaft sections 404 and 406, respectively.

Similarly to the above described embodiments, this embodiment of the drive mechanism comprises a transmitting gear-wheel 422 having an axis of rotation being parallel with the axis of the wobbling gear-wheel 414, 416 at a distance therefrom determined by the eccentricity parameter value, being connected to the drive mechanism housing 400 as being rotatable around its axis of rotation, having a first toothing 417 with a teeth number being different from the teeth number of each wobbling gear-wheel 414, 416, and connected to the wobbling gear-wheels 414, 416 with its first toothing 417, and further comprises a guiding connection establishing, upon motion of the first shaft 420, wobbling motion of the wobbling discs 405, 407 together with the connection between the wobbling gear-wheels 414, 416 and the transmitting gear-wheel 422, and having an axis being offset with respect to the axis of the eccentric shaft sections 404, 406.

In this embodiment, similarly to the above presented numerous other embodiments, the guiding connection is provided by means of a driving-bore formed in the wobbling disc, and a driving-shaft 410 arranged in the driving-bore. The driving-shaft 410 is received in the driving-bore in a manner similar to the embodiments described above.

As shown in FIG. 30, the wobbling discs 405, 407 are connected to the eccentric shaft sections 404, 406 through respective bearings 413, 415. The first shaft 420 is, of course, rotatably connected to the drive mechanism housing, and in this embodiment a rotatory member 416 adapted for rotating the first shaft 420 is also connected to the drive mechanism. In this embodiment the first shaft 420 may also constitute the rotor part of an electrically driven motor, the rotatory member 416 constituting the stator part of the same motor.

As with the above presented ones, in this embodiment the application of a single guiding connection in addition to the transmitting gear-wheel 422 is sufficient for generating the wobbling motion, but it is expedient to provide at least two guiding connections (in addition to the transmitting gear-wheel 422) within the drive mechanism such that adequate load distribution and stability can be provided.

As shown in FIG. 30, the shaft of the transmitting gear-wheel 422 also functions as an output driving shaft (a collecting gear-wheel and a separate shaft connected thereto are not required). This embodiment of the invention therefore has a simpler configuration compared to the other embodiments, since no further gearing is required for inducing the rotation of the output driving shaft because the transmitting gear-wheels are rotated by the wobbling discs 405, 407 themselves. It is also shown in FIG. 30 that the driving-shaft 410 is connected to the left side (according to the figure) of the drive mechanism housing 400. An embodiment is also conceivable wherein it is the driving-shaft 410 that is rotatably connected to both sides of the drive mechanism housing 400, or only to the right side thereof (according to the figure). The advantage of the present embodiment lies in that due to its simple structure it can be implemented with lower costs compared with the majority of the above described embodiments, and that it allows for very significantly increasing the transmission ratio of the drive mechanism with a relatively high efficiency.

Figures 31, 32:
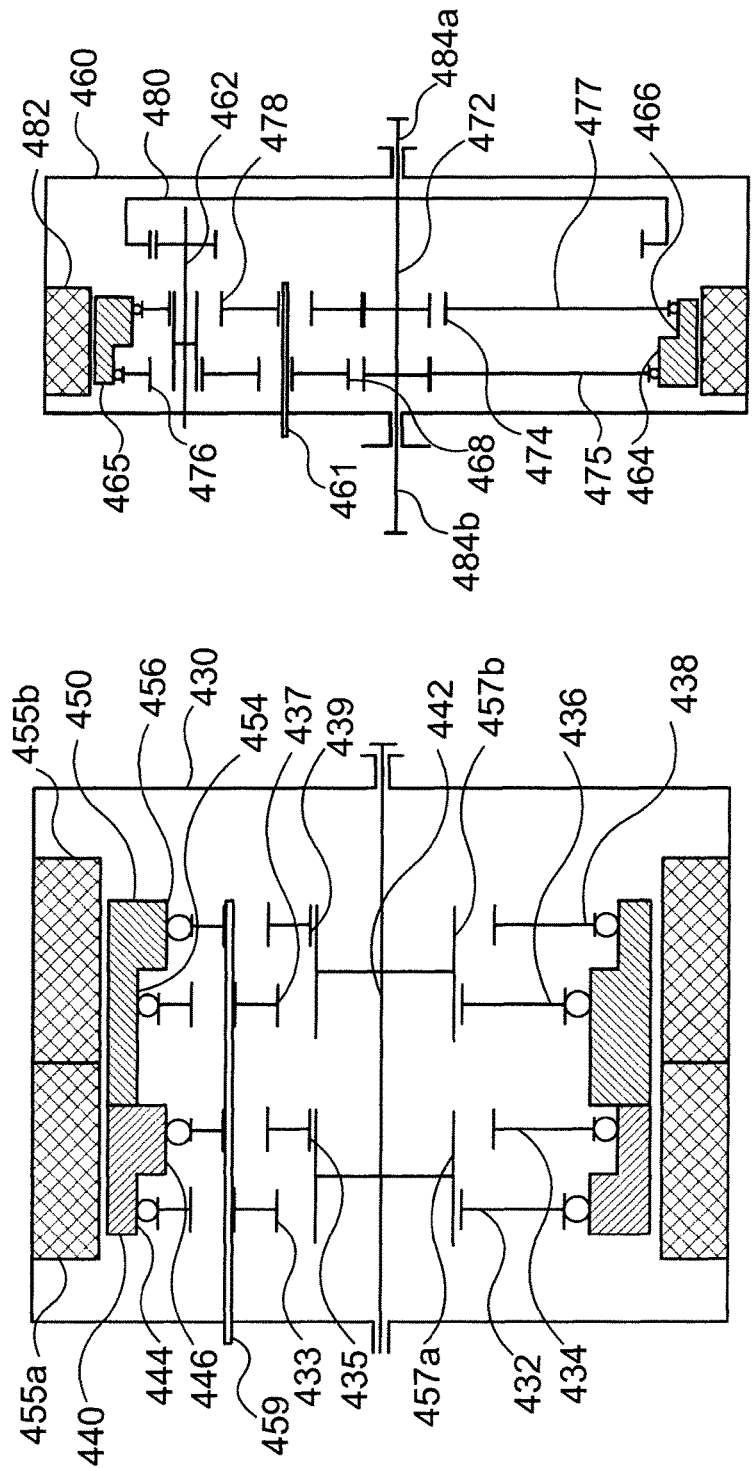
FIG. 31 is a schematic drawing illustrating an embodiment similar to the one shown in FIG. 30.
FIG. 32 is a schematic drawing illustrating an embodiment of the invention.

FIG. 31 illustrates a drive mechanism that is similar to the one shown in FIG. 30 but has two stages instead of a single stage. In this embodiment a transmitting gear-wheel 442 is arranged in a drive mechanism housing 430 in a central position similarly to the embodiment of FIG. 30. A pair of wobbling discs 432, 434 is arranged in the drive mechanism with the corresponding wobbling gear-wheels 433 and 435, and another pair of wobbling discs 436, 438 has corresponding wobbling gear-wheels 437, 439. A first shaft 440 corresponds to the first pair of wobbling discs 432, 434 and a first shaft 450 corresponds to the other pair of wobbling discs 436, 438. The wobbling discs 432 and 434 are rotatably connected to the eccentric shaft sections 444 and 446, respectively, of the first shaft 440. In a similar manner, the wobbling discs 436 and 438 are rotatably connected to the eccentric shaft sections 454 and 456, respectively, of the first shaft 450. In a manner shown in FIG. 31—as with the above described embodiments that comprise driving-bores and driving-shafts—a driving-shaft 459 is arranged in driving-bores formed in the wobbling discs 432, 434, 436 and 438. A separate rotatory member 455a and 455b adapted for rotating the first shafts 440, 450 is arranged corresponding to each first shaft 440, 450.

The present embodiment can be operated as a multiple-stage drive mechanism as follows. The wobbling gear-wheels 433 and 435 have the same number of teeth, and the wobbling gear-wheels 437 and 439 also have the same number of teeth. However, the wobbling gear-wheels 433 and 437 and/or the toothings 457a and 457b of the transmitting gear-wheel 442 preferably have teeth numbers different different from each other. In sum, to implement the two stages it should be provided that the two pairs of discs can realize two different transmission ratios.

In the present embodiment the two stages can be implemented in case, at the same time instance, only one of the toothings 457a and 457b is connected to the shaft of the transmitting gear-wheel 442 in such a fixed manner that toothing cannot be rotated about the shaft. The toothings are preferably connected to the shaft of the transmitting gear-wheel 442 in a releasable manner, and of the two releasable connections the one corresponding to the stage to be engaged should be fixed. That way, the other released (rotatable) toothing will be able to freely rotate about the shaft of the transmitting gear-wheel 422, and thus it will provide no force transmission. The stage-changing can also be established by connecting the wobbling gear-wheels to the wobbling disc by releasable connection (in a manner described above), and, upon engaging a stage, releasing the wobbling gear-wheels of the stage not being engaged, that is, by allowing them to rotate freely with respect to the wobbling disc (in this case these gears are not capable of power transmission). In a manner analogous to the above, drive mechanisms having more than two stages can also be made.

In this embodiment, therefore, a first-stage wobbling gear-wheel 433, 435 is arranged on a first-stage wobbling disc 432, 434 that is connected to a first-stage first shaft 440, and a second-stage wobbling gear-wheel 437, 439 is arranged on a second-stage wobbling disc 436, 438 that is connected to a second-stage first shaft 450, and the transmitting gear-wheel 442 comprises a first-stage first toothing 457a and a second-stage first toothing 457b corresponding, respectively, to the first-stage wobbling gear-wheel 433, 435 and to the second-stage wobbling gear-wheel 437, 439, the first-stage and the second-stage first toothing have a different number of teeth than the corresponding wobbling gear-wheels.

In the drive mechanism the first-stage wobbling gear-wheel 433, 435 and/or the second-stage wobbling gear-wheel 437, 439, are connected by releasable connection to the first-stage wobbling disc 432, 434 and to the second-stage wobbling disc 436, 438, respectively, and/or the first-stage first toothing and/or the second-stage first toothing 457b of the transmitting gear-wheel 442 is connected by a releasable connection to the shaft of the transmitting gear-wheel 442.

For both stages the releasable connection can be established either between the given wobbling discs 432, 434, 436, 438 and the wobbling gear-wheels 433, 435, 437, 439 connected to them (mode 1), or between the given first toothings 457a, 457b and the shaft of the transmitting gear-wheel 442 (mode 2). It may also be contemplated to use connection mode 1 for one stage and mode 2 for the other stage.

Accordingly, the combination of modes 1 and 2 is similar to what was put forward in relation to FIGS. 15-18, where the releasable connection could be established either between the wobbling disc and the wobbling gear-wheel or between the first and second toothings of the transmitting gear-wheel in such a manner that the connection was established in one way in one of the stages and in the other way in the other stage.

When a given stage is engaged, a fixed connection is established between the given pair of wobbling discs (the first-stage wobbling discs 432 and 434 or the second-stage wobbling discs 436 and 438) and the shaft of the transmitting gear-wheel (that is, if both modes of establishing a releasable connection are applied, both connections should be fixed for a given stage), while the other stage is disengaged.

Both stages cannot be engaged at the same time, except when it is made possible by the teeth numbers of the wobbling gear-wheels and the first toothings (that is, the first and the second stage is implemented with the same teeth numbers), i.e. all wobbling discs are capable of driving the transmitting gear-wheel 442 in a cooperating manner. In the latter case, however, the two stages are not arranged separately, but rather the transmitting gear-wheel is rotated by the motion of four wobbling discs (this is essentially an embodiment comprising four wobbling discs). Thereby the load share of any given disc will be lower.

FIG. 32 illustrates a further embodiment, wherein a transmitting gear-wheel 472 is centrally arranged, and a transmitting gear-wheel 462 is arranged at a region lying further outwards than the centre of the wobbling discs 475, 477 (at a radius of the wobbling discs 475, 477 lying outer than the centre thereof). As it is illustrated by this embodiment, a further transmitting gear-wheel can also be arranged in the drive mechanism in addition to the centrally positioned transmitting gear-wheel 472. The transmitting gear-wheel 462 is arranged in a manner similar to the transmitting gear-wheels in the embodiments illustrated in the first few figures, i.e. for example more than one transmitting gear-wheel can be arranged being connected to the wobbling discs 475, 477. A multiple-stage drive mechanism can be implemented also by applying the present embodiment in a manner explained below.

In this embodiment the drive mechanism comprises a drive mechanism housing 460, inside which a first shaft 465 is arranged between rotatory members 482 facilitating the rotation thereof. The wobbling discs 475 and 477 are rotatably connected to eccentric shaft sections 464 and 466 of the first shaft 465. In the wobbling disc 475 a wobbling gear-wheel 468 corresponding to the centrally positioned transmitting gear-wheel 472 is arranged, and a wobbling gear-wheel 476 corresponding to the other transmitting gear-wheel 462 is also arranged. Wobbling gear-wheels 474 and 478 corresponding, respectively, to the transmitting gear-wheels 472 and 462, are arranged in the wobbling disc 477. In the present embodiment a driving-shaft 461 is also arranged, which is adapted for providing a further guiding connection by means of the driving-bores shown in the figure. This further guiding connection is not necessarily required because the wobbling motion of the wobbling discs can already be induced by means of the wobbling gear-wheels 462, 472 shown in the figure. In addition to these two wobbling gear-wheels 462, 472, however a further guiding connection can be preferably arranged because at least two guiding connections arranged in an off-centre manner are preferably applied in the invention.

As shown in the drawing, in this embodiment a first shaft 465 is applied, and, due to the appropriate configuration, the shaft—an output driving shaft in this embodiment, but it can also be applied as an input driving shaft—can be leaded out at both sides as shafts 484a and 484b. Shafts leaded out at both sides can have a number of advantageous applications. (It has to be noted here that in the embodiment shown in FIG. 30 the shaft of the transmitting gear-wheel 422—as an output/input driving shaft—can also be leaded out at both sides of the drive mechanism housing, as there is no technical limitation preventing that).

In the present embodiment an internally toothed collecting gear-wheel 480 is connected to the second toothing of the transmitting gear-wheel 462, and the collecting gear-wheel 480 is mounted by a releasable or a fixed connection to the shaft of the transmitting gear-wheel 472. With a fixed connection both transmitting gear-wheels can contribute to driving the shaft 484a, 484b. If the drive is designed accordingly, these transmitting gear-wheels are rotated such that they are capable of driving the shaft 484a, 484b in a synchronized manner; however, the present embodiment may also be applied for implementing a multiple-stage drive mechanism as detailed below.

In case the connection between the collecting gear-wheel 480 and the shaft of the transmitting gear-wheel 472 is released, the rotation of the output driving shafts 484a, 484b is induced solely through the transmitting gear-wheel 472. (Provided that the toothings of the transmitting gear-wheel 472 are not released with respect to the shaft.) By releasing the connection between the transmitting gear-wheel 472 and its toothings and in case of fixing the connections between the collecting gear-wheel 480 and the shaft 484a, 484b it can be provided that the output driving shafts 484a, 484b are driven by the transmitting gear-wheel 462 (or by more than one transmitting gear-wheels if they are included). As with the embodiment explained above in relation to FIG. 31, the connection between the centrally arranged transmitting gear-wheel 472 and the wobbling disc can be released in multiple ways.

In the embodiment shown in FIG. 32, therefore, the drive mechanism comprises, in addition to the centrally arranged transmitting gear-wheel, an additional wobbling gear-wheel having axis being offset with respect to the axis of the eccentric shaft section and an additional transmitting gear-wheel connected to the additional wobbling gear-wheel.

Therefore, to apply the present embodiment as a two-stage drive mechanism:
 the wobbling gear-wheel 468, 474 and/or the additional wobbling gear-wheel 476, 478 is connected to a respective wobbling disc 475, 477 by a releasable connection, and/or
 the first toothing of the transmitting gear-wheel 472 and/or a first toothing of the additional transmitting gear-wheel 462 through a collecting gear-wheel 480 connected to the second toothing thereof is connected by a releasable connection to the shaft of the transmitting gear-wheel 472.

Of these combinations the releasable connections should be arranged such that both transmitting gear-wheels 462, 472 are disengageable, i.e. that, at any given time, one of them can be disengaged, and power can be transmitted through one of them.

Accordingly, the transmitting gear-wheel 462 can be disengaged by releasing the connection between the wobbling gear-wheels 476, 478 and the wobbling discs 475, 477, or by releasing the connection between the first toothings and the second toothing of the transmitting gear-wheel 462 (such that the first and/or the second toothing can be freely rotated about the shaft of the transmitting gear-wheel 462), or by releasing the connection between the collecting gear-wheel 480 and the shafts 484a, 484b. Any one of these connection points can be released in order to disengage the transmitting gear-wheel 462, i.e. for engaging the stage implemented applying the transmitting gear-wheel 472. In order to engage the stage corresponding to the transmitting gear-wheel 462 all of the above releasable connections have to be fixed.

The transmitting gear-wheel 472 can be disengaged by releasing the connection between the wobbling gear-wheels 468, 474 and the wobbling discs 475, 477, or by releasing the connection between the first toothing and the shaft of the transmitting gear-wheel 472. To disengage the transmitting gear-wheel 472 it is sufficient to release any of these connections, while in order to engage the stage implemented by the transmitting gear-wheel 472 all of these connections have to be fixed.

Naturally, two different stages cannot be simultaneously engaged, i.e. as explained above, the only way for simultaneously "engaging" both transmitting gear-wheels 462, 472 is by providing that their motion is synchronized or "compatible" with each other.

The embodiment according to FIG. 33 is similar to the one illustrated in FIG. 6. This embodiment comprises a first shaft 383 having eccentric shaft sections 384 and 386. In this embodiment there is further arranged a transmitting gear-wheel 382 and a driving-shaft 390. Applying at least two such connections and utilizing the first shaft 383 as an input driving shaft the wobbling motion of the wobbling discs 385, 387 can be provided.

In the present embodiment an eccentric shaft 381 is connected to that end of the transmitting gear-wheel 382 which is not connected to the drive mechanism housing 15. A wobbling gear-wheel 324 is connected to the wobbling disc 385, and a wobbling gear-wheel 326 is connected to the wobbling disc 387. The end of the eccentric shaft 381 undergoes circular motion, by means of which the disc 392 connected to the free end of the eccentric shaft 381 (the right side end according to the figure) can be induced to undergo wobbling motion (particularly in case two or more such eccentric shafts 381 are included). A collecting gear-wheel 397, to which a second shaft 398 is connected, is driven by inducing the disc 392 to wobbling motion. In the present embodiment the transmission ratio of the drive mechanism can be increased by a very large extent, with a relatively high efficiency. As shown in FIG. 33 the eccentric shaft 381 has two parallel sections that are offset (shifted) relative to each other. In case preferably two (or even more) additional wobbling discs are applied, a shaft comprising multiple separate offset sections—for example, in a manner similar to the first shaft 10—should be utilized in order to induce the appropriate wobbling motion.

In this embodiment, therefore, the transmitting gear-wheel 382 has an external first toothing and an eccentric shaft 381 extending from the wobbling discs 385, 387 is connected to the shaft of the transmitting gear-wheel, an additional wobbling disc 392, being constrainable to wobbling motion by the rotation of the eccentric shaft 381, is rotatably connected to the end of the eccentric shaft 381 being opposite the transmitting gear-wheel, and an additional wobbling gear-wheel, adapted for driving an additional collecting gear-wheel 397, is arranged on the additional wobbling disc 392. This wobbling gear-wheel thereby drives the collecting gear-wheel 397 by its wobbling motion, similar to the driving of the above described transmitting gear-wheels by wobbling gear-wheels.

A still further embodiment of the invention is illustrated in FIG. 34. In this embodiment the drive mechanism comprises the first shaft 383 to which eccentric shaft sections 384 and 386 are connected. Respective wobbling discs 498 and 502 are rotatably connected to each eccentric shaft section. In this embodiment, a transmitting gear-wheel 492 is connected to the wobbling gear-wheels 504 and 506 of the wobbling discs 498 and 502.

At each side of the wobbling discs 498, 502 a respective bearing support 494 and 496 is arranged on the transmitting gear-wheel 492 such that they are supported against the walls (driving-member 497) arranged as the extension of the wobbling gear-wheels (functioning as a guiding connection, strengthening the connection provided by the transmitting gear-wheel 492 that also functions as a guiding connection), in a manner similar to the driving-shafts guided in the driving-bores in the above described embodiments.

This allows that, in addition to performing its function as a transmitting gear-wheel, the transmitting gear-wheel 492 can also perform the function of a driving-shaft, and thereby this combined-functionality guiding connection can be arranged in a more space-saving manner in the wobbling discs. Of course, at least two of this combined-functionality connection (transmitting gear-wheel 492, bearings 494, 496, appropriately configured driving-bores) have to be arranged in order to induce the wobbling motion of the wobbling discs 498, 502. A collecting gear-wheel 514 is connected to the second toothing of the transmitting gear-wheels 492, and a second shaft 516 is connected to the collecting gear-wheel 514. By combining the guiding connections it can be achieved that more guiding connections can be arranged on the same pitch circle (since there is no need to include separate driving-bores and wobbling gear-wheels). Thereby, the efficiency of power branching is increased further and the overall dimensions can also be reduced (by including more instances of the wobbling gear-wheel—transmitting gear-wheel connection the dimensions of the applied components can be reduced because individual components are subjected to lower loads).

By means of combining the transmitting gear-wheel and the solution applying a driving-shaft and driving-bore, in the embodiment according to FIG. 34 the shaft of the transmitting gear-wheel is the driving-shaft (i.e. it functions as a driving-shaft), while a cylindrical-surface driving-member 497, arranged coaxially with the wobbling gear-wheel, is the driving-bore (i.e. functioning the driving-bore). As shown in FIG. 34, in this embodiment the transmitting gear-wheel has an external first toothing, while the wobbling gear-wheel is internally toothed.

In some embodiments of the drive mechanism according to the invention, power density can be increased with favourable efficiency and small radial dimensions by applying power branching at the input (at the wobbling disc), and by "adding up" the power at a single output driving collecting gear-wheel having either external or internal toothing, while the transmission ratio can also be selected from a very wide range depending on the number of teeth of the collecting gear-wheel and the transmitting gear-wheels driven by the wobbling disc.

A further advantage of the drive mechanism according to the invention is that by eliminating gear-wheel teeth backlash—for example, in case of the transmitting gear-wheels arranged around the collecting gear-wheel, by tensioning—the toothings can be made backlash-free in a known manner, resulting in a low-noise, precisely adjustable and positionable drive unit.

The great advantage of the drive mechanism according to the invention is manifested in that a comparison of the mass and efficiency of the drive mechanism designed according to the invention and the multiple-stage planetary drive mechanisms currently available commercially (at the same input power and transmission ratio) shows a large reduction of overall dimensions—and therefore mass—while the efficiency of the drive mechanism is higher.

For example, compared to a known planetary drive mechanism for wind turbines, adapted for transmitting 8 MW of mechanical power, a drive mechanism according to the invention comprising 8 transmitting gear-wheels, 8 guiding connections and 2 wobbling discs a mass reduction of almost 40% can be achieved due to the higher power density resulting from more efficient power branching and to the more compact structural arrangement, while the efficiency is almost 3% higher than the efficiency of the planetary drive mechanism that has more teeth-engagements. This constitutes a serious advantage from the aspects of energetics, economy, and the potential fields of industrial application.

The invention is further illustrated by way of the following examples:

EXAMPLE 1

A drive mechanism for transmitting rotating motion, comprising
  a drive mechanism housing and a first shaft rotatably connected to the drive mechanism housing,
  an eccentric shaft section being parallel with the first shaft and being offset with respect to first shaft by an eccentricity parameter value,
  a wobbling disc being rotatably connected to the eccentric shaft section, and
  a wobbling gear-wheel connected by means of a fixed or a releasable connection to the wobbling disc and having an axis being parallel with the first shaft,
characterised in that the axis of the wobbling gear-wheel is offset with respect to the axis of the eccentric shaft section, and the drive mechanism further comprises
  a transmitting gear-wheel having an axis of rotation being parallel with the axis of the wobbling gear-wheel at a distance therefrom determined by the eccentricity parameter value, being connected to the drive mechanism housing as being rotatable around its axis of rotation, having a first toothing with a teeth number being different from the teeth number of the wobbling gear-wheel, and connected to the wobbling gear-wheel with its first toothing, and
  a guiding connection establishing, upon motion of the first shaft, wobbling motion of the wobbling disc together with the connection between the wobbling gear-wheel and the transmitting gear-wheel, and having an axis being offset with respect to the axis of the eccentric shaft section.

Further corresponding examples are the following and numbered as given below:

2. The drive mechanism according to example 1, characterised in that the eccentric shaft section is connected to the end of the first shaft being at the drive mechanism housing.

3. The drive mechanism according to claim example 1, characterised in that the eccentric shaft section is formed within the first shaft as a tubular shaft section connected to the periphery of the wobbling disc.

4. The drive mechanism according to any of examples 1 to 3, characterised in that the guiding connection is formed by at least one further wobbling gear-wheel and a transmitting gear-wheel connected thereto.

5. The drive mechanism according to example 4, characterised by comprising three or more wobbling gear-wheels arranged symmetrically on the wobbling disc around the eccentric shaft section, and transmitting gear-wheels are connected to the wobbling gear-wheels.

6. The drive mechanism according to any of examples 1 to 5, characterised in that the guiding connection is formed by at least one driving-bore arranged in the wobbling disc and by a driving-shaft connected to the wall of the at least one driving-bore by means of a rotation-enabling connection, and the driving-shaft extending into the driving-bore has an axis of symmetry being offset from the central axis of the driving-bore by the eccentricity parameter in a direction opposite to the direction of the eccentric offset of the eccentric shaft section.

7. The drive mechanism according to example 6, characterised in that the rotation-enabling connection is formed by a rotatable connection arranged around the driving-shaft, the part of the rotatable connection, being rotatable around the driving-shaft, is supported against the wall of the driving-bore.
8. The drive mechanism according to example 6 or example 7, characterised in that the transmitting gear-wheel has an external first toothing, the wobbling gear-wheel has an internal toothing, the shaft of the transmitting gear-wheel is the driving-shaft, and the driving-bore is a driving-member having a cylindrical shape and being arranged coaxially with the wobbling gear-wheel.
9. The drive mechanism according to any of examples 1 to 8, characterised in that the transmitting gear-wheel has an external first toothing and an eccentric shaft extending from the wobbling disc is connected to the shaft of the transmitting gear-wheel, an additional wobbling disc, being constrainable to wobbling motion by the rotation of the eccentric shaft, is rotatably connected to the end of the eccentric shaft being opposite the transmitting gear-wheel, and an additional wobbling gear-wheel, adapted for driving an additional collecting gear-wheel, is arranged on the additional wobbling disc.
10. The drive mechanism according to any of examples 1 to 8, characterised by further comprising a second shaft rotatably connected to the drive mechanism housing and being parallel with the first shaft, a collecting gear-wheel connected to the end of the second shaft being at the drive mechanism housing, having an axis of rotation being parallel with the second shaft, and the transmitting gear-wheel comprises a second toothing connected to the collecting gear-wheel and being connected to the first toothing by means of a fixed or a releasable connection.
11. The drive mechanism according to example 10, characterised in that the first shaft and the second shaft are arranged coaxially with each other.
12. The drive mechanism according to example 11 or example 12, characterised in that the second toothing of the transmitting gear-wheel is arranged as an external toothing, and the collecting gear-wheel has an external toothing or internal toothing.
13. The drive mechanism according to example 12, characterised in that the collecting gear-wheel has an internal toothing, and a connecting member, having a passage opening arranged around the axis of rotation of the first shaft and being adapted for enabling the connection of the second shaft, is connected to the collecting gear-wheel.
14. The drive mechanism according to any of examples 10 to 12, characterised in that
a first-stage wobbling gear-wheel and a corresponding first-stage transmitting gear-wheel having a first toothing with a teeth number different from the teeth number of the first-stage wobbling gear-wheel, as well as a second-stage wobbling gear-wheel and a corresponding second-stage transmitting gear-wheel having a first toothing having a teeth number different from the teeth number of the second-stage wobbling gear-wheel, are arranged on the wobbling disc, in the drive mechanism
the first-stage wobbling gear-wheel and the second-stage wobbling gear-wheel are connected to the wobbling disc by a releasable connection, or the second toothing of the first-stage transmitting gear-wheel and the second toothing of the second-stage transmitting gear-wheel are connected by releasable connection to the first toothing of the first-stage transmitting gear-wheel and to the first toothing of the second-stage transmitting gear-wheel, respectively, and
a released connection can be established by releasing the releasable connection, as well as a fixed connection can be established by locking the releasable connection between the wobbling disc and the second toothing of the corresponding transmitting gear-wheel, and
one of the connection between the first-stage wobbling gear-wheel and the second toothing of the first-stage transmitting gear-wheel and the connection between the second-stage wobbling gear-wheel and the second toothing of the second-stage transmitting gear-wheel is a released connection, as well as the other one of the two connections is a fixed connection, and the guiding connection is formed by the released connection.
15. The drive mechanism according to example 14, characterised in that the first-stage wobbling gear-wheel and the second-stage wobbling gear-wheel are arranged at the same radius and have teeth numbers being different from each other.
16. The drive mechanism according to example 14, characterised in that the first-stage wobbling gear-wheel and the second-stage wobbling gear-wheel are arranged at radii being different from each other.
17. The drive mechanism according to any of examples 1 to 16, characterised in that the wobbling gear-wheel has an internal toothing, and the first toothing of the transmitting gear-wheel is an external toothing.
18. The drive mechanism according to example 17, characterised in that a first eccentric shaft section and a second eccentric shaft section, being offset with respect to first shaft in opposite directions by the same eccentricity parameter value, are connected one after the other to the first shaft, a first wobbling disc is rotatably connected to the first eccentric shaft section and a second wobbling disc is rotatably connected to the second eccentric shaft section, and first wobbling gear-wheels and second wobbling gear-wheels having identical configurations are connected in the same manner to the first wobbling disc and to the second wobbling disc, respectively, by means of fixed or releasable connections.
19. The drive mechanism according to any of examples 1 to 16, characterised in that the wobbling gear-wheel has an external toothing, and the first toothing of the transmitting gear-wheel is an internal toothing.
20. The drive mechanism according to example 3, characterised in that
an externally toothed additional gear-wheel, having an axis coinciding with the axis of rotation of the first shaft, is connected to the drive mechanism housing,
an internally toothed collecting gear-wheel having an axis of rotation coincident with the rotational axis of the first shaft is connected to the first shaft, wherein the collecting gear-wheel surrounds the additional gear-wheel, and
one or more epicycloidal wheels are arranged between the additional gear-wheel and the collecting gear-wheel, have an axis of rotation being parallel with the rotational axis of the additional gear-wheel and the collecting gear-wheel, is rotatably connected to the drive mechanism housing, and connected with its toothing to the additional gear-wheel and to the collecting gear-wheel.

21. The drive mechanism according to example 3, characterised in that
    an externally toothed additional gear-wheel, having an axis coinciding with the axis of rotation of the first shaft, is connected to the drive mechanism housing,
    an internally toothed auxiliary gear-wheel, having an axis of rotation coinciding with the rotational axis of the first shaft, is fixed to the drive mechanism housing such that it surrounds the additional gear-wheel,
    one or more epicycloidal wheels are arranged between the additional gear-wheel and the auxiliary gear-wheel, said one or more epicycloidal wheels have rotational axes being parallel with the rotational axis of the additional gear-wheel and the auxiliary gear-wheel, and the toothing of the one or more epicycloidal wheels is connected to the additional gear-wheel and to the auxiliary gear-wheel, and
    the one or more epicycloidal wheels are connected to the first shaft by means of one or more epicyclic arms.

The invention is further illustrated by way of the following examples:

EXAMPLE 22

A drive mechanism for transmitting rotating motion, comprising
    a drive mechanism housing and a first shaft rotatably connected to the drive mechanism housing,
    an eccentric shaft section being parallel with the first shaft and being offset with respect to first shaft by an eccentricity parameter value,
    a wobbling disc being rotatably connected to the eccentric shaft section, and
    a wobbling gear-wheel connected by means of a fixed or a releasable connection to the wobbling disc and having an axis being parallel with the first shaft,
characterised in that the eccentric shaft section is formed within first shaft as a tubular shaft section connected to the periphery of the wobbling disc, and the axis of the wobbling gear-wheel coincides with the axis of the eccentric shaft section, the drive mechanism further comprising
    a transmitting gear-wheel having an axis of rotation being parallel with the axis of the wobbling gear-wheel at a distance therefrom determined by the eccentricity parameter value, being connected to the drive mechanism housing as being rotatable around its axis of rotation, having a first toothing with a teeth number being different from the teeth number of wobbling gear-wheel, and connected to the wobbling gear-wheel with its first toothing, and
    a guiding connection establishing, upon motion of the first shaft, wobbling motion of the wobbling disc together with the connection between the wobbling gear-wheel and the transmitting gear-wheel, and having an axis being offset with respect to the axis of the eccentric shaft section.

Further corresponding examples are the following and numbered as given below:

23. The drive mechanism according to example 3 or example 22, characterised in that recesses adapted for receiving magnetizable elements are arranged on the external periphery of the first shaft.

24. The drive mechanism according to example 23, characterised in that the recesses have a shape widening towards the rotational axis of the first shaft.

25. The drive mechanism according to any of examples 3 and 22 to 24, characterised in that a rotatory member adapted to be applied as the stator part of an electric motor is arranged along the periphery of the first shaft.

26. The drive mechanism according to any of examples 22 to 25, characterised by further comprising an additional wobbling gear-wheel having an axis being offset with respect to the axis of the eccentric shaft section, and an additional transmitting gear-wheel connected to the additional wobbling gear-wheel.

27. The drive mechanism according to example 26, characterised in that
    the wobbling gear-wheel and/or the additional wobbling gear-wheel is connected to the wobbling disc by a releasable connection, and/or
    the first toothing of the transmitting gear-wheel and/or a first toothing of the additional transmitting gear-wheel through a collecting gear-wheel connected to the second toothing thereof is connected by a releasable connection to the shaft of the transmitting gear-wheel.

28. The drive mechanism according to any of examples 22 to 25, characterised in that a first-stage wobbling gear-wheel is arranged on a first-stage wobbling disc connected to a first-stage first shaft, and a second-stage wobbling gear-wheel is arranged on a second-stage wobbling disc connected to a second-stage first shaft, and the transmitting gear-wheel comprises a first-stage first toothing and a second-stage first toothing corresponding, respectively, to the first-stage wobbling gear-wheel and to the second-stage wobbling gear-wheel, the first-stage and the second-stage first toothing have a different teeth number than the corresponding wobbling gear-wheels,
in the drive mechanism
    the first-stage wobbling gear-wheel and/or the second-stage wobbling gear-wheel is connected by a releasable connection to the first-stage wobbling disc and to the second-stage wobbling disc, respectively, and/or
    the first-stage first toothing and/or the second-stage first toothing of the transmitting gear-wheel is connected by a releasable connection to the shaft of the transmitting gear-wheel.

The invention is, of course, not limited to the preferred embodiments described in details above, but further variants, modifications and developments are possible within the scope of protection determined by the claims.

The invention claimed is:

1. A drive mechanism for transmitting rotating motion, comprising
    a drive mechanism housing (460) and a first shaft (465) rotatably connected to the drive mechanism housing (460),
    an eccentric shaft section (464, 466) being parallel with the first shaft (465) and being offset with respect to first shaft (465) by an eccentricity parameter value,
characterised by
    further comprising a first-stage wobbling gear-wheel (104, 124, 468, 474) arranged on a wobbling disc (100, 120, 475, 477), a first-stage transmitting gear-wheel (102, 122, 472) corresponding to the first-stage wobbling gear-wheel (104, 124, 468, 474) and having a first toothing with a teeth number different from the teeth number of the first-stage wobbling gear-wheel (104, 124, 468, 474), a second-stage wobbling gear-wheel (108, 128, 476) arranged on the wobbling disc (100, 120, 475, 477), and a second-stage transmitting gear-wheel (106, 126, 462) corresponding to the second-stage wobbling gear-wheel (108, 128, 476) and having a first toothing having a teeth number different from the teeth number of the first second-stage wobbling gear-wheel (108, 128, 476), wherein the different stages are engageable alternatively or simultaneously, and the first-stage wobbling gear-wheel (104, 124, 468, 474) and the second-stage wobbling gear-wheel (108, 128, 476) and/or the first toothing of the first-stage transmitting gear-wheel (102, 122, 472) and the first toothing of the second-stage transmitting gear-wheel (106, 126, 462) have toothing parameters different from each other, and/or the first-stage wobbling gear-wheel (124, 468, 474) and the second-stage wobbling gear-wheel (128, 476) are arranged at radii being different from each other, and/or the first-stage wobbling gear-wheel has an external toothing, the first toothing of the first-stage transmitting gear-wheel is an internal toothing, the second-stage wobbling gear-wheel has an internal toothing, and the first toothing of the second-stage transmitting gear-wheel is an external toothing, the wobbling disc (100, 120, 475, 477) is rotatably connected to the eccentric shaft section (464, 466), the first-stage wobbling gear-wheel (104, 124, 468, 474) and the second-stage wobbling gear-wheel (108, 128, 476) are connected by means of a fixed or a releasable connection to the wobbling disc (100, 120, 475, 477) and having an axis being parallel with the first shaft (465), the axes of the first-stage wobbling gear-wheel (104, 124) and the second-stage wobbling gear-wheel (108, 128) are offset with respect to the axis of the corresponding eccentric shaft section, or the axis of one of the first-stage wobbling gear-wheel (468, 474) and the second-stage wobbling gear-wheel coincides with the axis of the eccentric shaft section (464, 466), the first-stage transmitting gear-wheel (102, 122, 472) and the second-stage transmitting gear-wheel (106, 126, 462) have an axis of rotation being parallel with the axis of the corresponding wobbling gear-wheel (104, 108, 124, 128, 468, 474, 476), respectively, at a distance therefrom determined by the eccentricity parameter value, are connected to the drive mechanism housing (460) as being rotatable around their axis of rotation, each have a first toothing with a teeth number being different from the teeth number of the corresponding wobbling gear-wheel (104, 108, 124, 128), and are connected to the corresponding wobbling gear-wheel (104, 108, 124, 128, 468, 474, 476) with their first toothings, and wherein, with the connection between the first-stage wobbling gear-wheel (104, 124, 468, 474) and the first toothing of the first-stage transmitting gear-wheel (102, 122, 472) and the connection between the second-stage wobbling gear-wheel (108, 128, 476) and the first toothing of the second-stage transmitting gear-wheel (106, 126, 462), upon rotation of the first shaft (465), wobbling motion of the wobbling disc (100, 120, 475, 477) is established.

2. A drive mechanism for transmitting rotating motion, comprising a drive mechanism housing (430), characterised by further comprising a first-stage wobbling gear-wheel (433, 435) arranged on a first-stage wobbling disc (432, 434) being connected to a first-stage first shaft (440) rotatably connected to the drive mechanism housing (430), and a second-stage wobbling gear-wheel (437, 439) arranged on a second-stage wobbling disc (436, 438) being connected to a second-stage first shaft (450) rotatably connected to the drive mechanism housing (430), and a transmitting gear-wheel (442) comprises a first-stage first toothing (457a) and a second-stage first toothing (457b) corresponding, respectively, to the first-stage wobbling gear-wheel (433, 435) and to the second-stage wobbling gear-wheel (437, 439), wherein the different stages are engageable alternatively or simultaneously, and the first-stage wobbling gear-wheel (433, 435) and the second-stage wobbling gear-wheel (437, 439) and/or the first-stage first toothing (457a) of the transmitting gear-wheel (442) and the second-stage first toothing (457b) of the transmitting gear-wheel (442) have toothing parameters different from each other, and/or the first-stage wobbling gear-wheel has an external toothing, the first-stage first toothing of the transmitting gear-wheel is an internal toothing, the second-stage wobbling gear-wheel has an internal toothing, and the second-stage first toothing of the transmitting gear-wheel is an external toothing, and a guiding connection is arranged to establish, upon rotation of at least one of the first-stage first shaft (440) and the second-stage first shaft (450), wobbling motion of the corresponding at least one of the first-stage wobbling disc (432, 434) and the second-stage wobbling disc (436, 438) together with the connection between the wobbling gear-wheels (433, 435, 437, 439) and the corresponding first toothings of the transmitting gear-wheel (442), and the guiding connection has an axis being offset with respect to the axis of eccentric shaft sections (444, 446, 464, 466) being parallel with the corresponding first shaft (440, 450) and being offset with respect to the corresponding first shaft (440, 450) by an eccentricity parameter value, the first-stage wobbling disc (432, 434) and the second-stage wobbling disc (436, 438) are rotatably connected to the corresponding eccentric shaft section (444, 446, 464, 466), the first-stage wobbling gear-wheel (432, 434) and the second-stage wobbling gear-wheel (436, 438) are connected by means of a fixed or a releasable connection to the corresponding wobbling disc (432, 434, 436, 438) and having an axis being parallel with the corresponding first shaft (440, 450), the axes of the first-stage wobbling gear-wheel (433, 435) and the second-stage wobbling gear-wheel (437, 439) are offset with respect to the axis of the corresponding eccentric shaft section, or the axes of the first-stage wobbling gear-wheel (433, 435) and the second-stage wobbling gear-wheel (437, 439) coincide with the axis of the corresponding eccentric shaft section (444, 446, 464, 466), the transmitting gear-wheel (442) has an axis of rotation being parallel with the axes of the corresponding wobbling gear-wheels (433, 435, 437, 439) at a distance therefrom determined by the eccentricity parameter value, is connected to the drive mechanism housing (430) as being rotatable around their axis of rotation, wherein the first-stage first toothing (457*a*) and the second-stage first toothing (457*b*) of the transmitting gear-wheel (442) have a teeth number being different from the teeth number of the corresponding wobbling gear-wheel (433, 435, 437, 439), and the transmitting gear-wheel (442) is connected to the corresponding wobbling gear-wheels (433, 435, 437, 439) with its first toothings (457*a*, 457*b*).

3. The drive mechanism according to claim 1, characterised in that the eccentric shaft section is formed within the first shaft as a tubular shaft section connected to the periphery of the wobbling disc.

4. The drive mechanism according to claim 1, characterised in that at least one driving-bore is arranged in the wobbling disc (100, 120, 385, 387) and a driving-shaft (330, 390) connected to the wall of the at least one driving-bore by means of a rotation-enabling connection, and the driving-shaft (330, 390) extending into the driving-bore has an axis of symmetry being offset from the central axis of the driving-bore by the eccentricity parameter in a direction opposite to the direction of the eccentric offset of the eccentric shaft section.

5. The drive mechanism according to claim 2, characterised in that the guiding connection is formed by at least one driving-bore arranged in the wobbling disc and by a driving-shaft connected to the wall of the at least one driving-bore by means of a rotation-enabling connection, and the driving-shaft extending into the driving-bore has an axis of symmetry being offset from the central axis of the driving-bore by the eccentricity parameter in a direction opposite to the direction of the eccentric offset of the eccentric shaft section.

6. The drive mechanism according to claim 4, characterised in that the rotation-enabling connection is formed by a rotatable connection arranged around the driving-shaft (330, 390), the part of the rotatable connection, being rotatable around the driving-shaft (330, 390), is supported against the wall of the driving-bore.

7. The drive mechanism according to claim 4, characterised in that the transmitting gear-wheel (492) has an external first toothing, the wobbling gear-wheel (504, 506) has an internal toothing, the shaft of the transmitting gear-wheel (492) is the driving-shaft, and the driving-bore is a driving-member (497) having a cylindrical shape and being arranged coaxially with the wobbling gear-wheel.

8. The drive mechanism according to claim 1, characterised in that the transmitting gear-wheel (382) has an external first toothing and an eccentric shaft (381) extending from the wobbling disc (385, 387) is connected to the shaft of the transmitting gear-wheel (382), an additional wobbling disc (392), being constrainable to wobbling motion by the rotation of the eccentric shaft (381), is rotatably connected to the end of the eccentric shaft (381) being opposite the transmitting gear-wheel (382), and an additional wobbling gear-wheel, adapted for driving an additional collecting gear-wheel (397), is arranged on the additional wobbling disc (392).

9. The drive mechanism according to claim 1, characterised in that the axes of the first-stage wobbling gear-wheel (104, 124) and the second-stage wobbling gear-wheel (108, 128) are offset with respect to the axis of the corresponding eccentric shaft section, and the drive mechanism further comprises a second shaft (114, 136) rotatably connected to the drive mechanism housing and being parallel with the first shaft, a collecting gear-wheel (112, 134) connected to the end of the second shaft (114, 136) being at the drive mechanism housing, having an axis of rotation being parallel with the second shaft (114, 136), and each of the first-stage transmitting gear-wheel (102, 106, 122, 126) and second-stage transmitting gear-wheel comprises a second toothing (110, 111, 130, 132) connected to the collecting gear-wheel (112, 134) and being connected to the first toothing by means of a fixed or a releasable connection.

10. The drive mechanism according to claim 9, characterised in that that the second toothing of the transmitting gear-wheel is arranged as an external toothing, and the collecting gear-wheel has an internal toothing, and a connecting member, having a passage opening arranged around the axis of rotation of the first shaft and being adapted for enabling the connection of the second shaft, is connected to the collecting gear-wheel.

11. The drive mechanism according to claim 1, characterised in that
in the drive mechanism
the first-stage wobbling gear-wheel (104, 124) and the second-stage wobbling gear-wheel (108, 128) are connected to the wobbling disc (100, 120) by a releasable connection, or
the second toothing (111, 130) of the first-stage transmitting gear-wheel (102, 122) and the second toothing (110, 132) of the second-stage transmitting gear-wheel (106, 126) are connected by releasable connection to the first toothing of the first-stage transmitting gear-wheel (102, 122) and to the first toothing of the second-stage transmitting gear-wheel (106, 126), respectively, and
a released connection can be established by releasing the releasable connection, as well as a fixed connection can be established by locking the releasable connection between the wobbling disc (100, 120) and the second toothing (110, 111, 130, 132) of the corresponding transmitting gear-wheel (104, 108, 124, 128), and
one of the connection between the first-stage wobbling gear-wheel (104, 124) and the second toothing (111, 130) of the first-stage transmitting gear-wheel (102, 122) and the connection between the second-stage wobbling gear-wheel (108, 128) and the second toothing (110, 132) of the second-stage transmitting gear-wheel (106, 126) is a released connection, as well as the other one of the two connections is a fixed connection, and the guiding connection is formed by the released connection.

12. The drive mechanism according to claim 3, characterised in that
an externally toothed additional gear-wheel (366), having an axis coinciding with the axis of rotation of the first shaft, is connected to the drive mechanism housing (315),
an internally toothed collecting gear-wheel (362) having an axis of rotation coincident with the rotational axis of the first shaft is connected to the first shaft, wherein the collecting gear-wheel (362) surrounds the additional gear-wheel (366), and
one or more epicycloidal wheels (364) are arranged between the additional gear-wheel (366) and the collecting gear-wheel (362), have an axis of rotation being parallel with the rotational axis of the additional gear-wheel (366) and the collecting gear-wheel (362), is rotatably connected to the drive mechanism housing (315), and connected with its toothing to the additional gear-wheel (366) and to the collecting gear-wheel (362).

13. The drive mechanism according to claim 3, characterised in that
- an externally toothed additional gear-wheel (366), having an axis coinciding with the axis of rotation of the first shaft, is connected to the drive mechanism housing (315),
- an internally toothed auxiliary gear-wheel (374), having an axis of rotation coinciding with the rotational axis of the first shaft, is fixed to the drive mechanism housing (315) such that it surrounds the additional gear-wheel (366),
- one or more epicycloidal wheels (364) are arranged between the additional gear-wheel (366) and the auxiliary gear-wheel (374), said one or more epicycloidal wheels (364) have rotational axes being parallel with the rotational axis of the additional gear-wheel (366) and the auxiliary gear-wheel (374), and the toothing of the one or more epicycloidal wheels (364) is connected to the additional gear-wheel (366) and to the auxiliary gear-wheel (374), and
- the one or more epicycloidal wheels (364) are connected to the first shaft by means of one or more epicyclic arms (376).

14. The drive mechanism according to claim 3, characterised in that a rotatory member (455a, 455b, 482), adapted for rotating the first shaft and adapted to be applied as the stator part of an electric motor, is arranged along the periphery of the first shaft (440, 450).

15. The drive mechanism according to claim 2, characterised in that in the drive mechanism
- the first-stage wobbling gear-wheel (433, 435) and/or the second-stage wobbling gear-wheel (437, 439) is connected by a releasable connection to the first-stage wobbling disc (432, 434) and to the second-stage wobbling disc (436, 438), respectively, and/or
- the first-stage first toothing (457a) and/or the second-stage first toothing (457b) of the transmitting gear-wheel (442) is connected by a releasable connection to the shaft of the transmitting gear-wheel (442).

16. The drive mechanism according to claim 2, characterised in that the eccentric shaft section is formed within the first shaft as a tubular shaft section connected to the periphery of the wobbling disc.

17. The drive mechanism according to claim 5, characterised in that the rotation-enabling connection is formed by a rotatable connection arranged around the driving-shaft (330, 390), the part of the rotatable connection, being rotatable around the driving-shaft (330, 390), is supported against the wall of the driving-bore.

18. The drive mechanism according to claim 5, characterised in that the transmitting gear-wheel (492) has an external first toothing, the wobbling gear-wheel (504, 506) has an internal toothing, the shaft of the transmitting gear-wheel (492) is the driving-shaft, and the driving-bore is a driving-member (497) having a cylindrical shape and being arranged coaxially with the wobbling gear-wheel.

19. The drive mechanism according to claim 2, characterised in that the transmitting gear-wheel (382) has an external first toothing and an eccentric shaft (381) extending from the wobbling disc (385, 387) is connected to the shaft of the transmitting gear-wheel (382), an additional wobbling disc (392), being constrainable to wobbling motion by the rotation of the eccentric shaft (381), is rotatably connected to the end of the eccentric shaft (381) being opposite the transmitting gear-wheel (382), and an additional wobbling gear-wheel, adapted for driving an additional collecting gear-wheel (397), is arranged on the additional wobbling disc (392).

* * * * *